United States Patent [19]

Amdahl

[11] 4,245,302

[45] Jan. 13, 1981

[54] COMPUTER AND METHOD FOR EXECUTING TARGET INSTRUCTIONS

[75] Inventor: Carlton G. Amdahl, Santa Clara County, Calif.

[73] Assignee: Magnuson Computer Systems, Inc., San Jose, Calif.

[21] Appl. No.: 949,924

[22] Filed: Oct. 10, 1978

[51] Int. Cl.³ .............................................. G06F 9/22
[52] U.S. Cl. ................................................... 364/200
[58] Field of Search .............................. 364/200, 900

[56] References Cited

U.S. PATENT DOCUMENTS

| | | | |
|---|---|---|---|
| 3,736,567 | 5/1973 | Lotan et al. | 364/200 |
| 3,972,024 | 7/1976 | Schroeder et al. | 364/200 |
| 4,003,033 | 1/1977 | O'Keefe et al. | 364/200 |
| 4,038,643 | 7/1977 | Kim | 364/200 |
| 4,075,687 | 2/1978 | Nissen et al. | 364/200 |
| 4,080,648 | 3/1978 | Asano et al. | 364/200 |
| 4,131,941 | 12/1978 | Siegel et al. | 364/200 |
| 4,131,943 | 12/1978 | Shiraogawa | 364/200 |
| 4,145,736 | 3/1979 | Yamada et al. | 364/200 |
| 4,156,900 | 5/1979 | Gruno et al. | 364/200 |

OTHER PUBLICATIONS

"Microprogramming Handbook", by Mick & Brick, Published by Advanced Micro Devices, Inc., in 1976, pp. 1-1 to 1-15, 2-2, 2-16.

Primary Examiner—Charles E. Atkinson
Assistant Examiner—Gary Chin
Attorney, Agent, or Firm—David E. Lovejoy

[57] ABSTRACT

A microinstruction-controlled computer including a sequencer for controlling the sequencing of microinstructions. The computer executes target instructions by executing a number of microinstructions for each target instruction. Microinstructions are grouped in one or more microinstruction subroutines in a microstore. Microaddresses for addressing microinstructions and subroutines in the microstore are provided by a microaddress generator which includes a stack unit and other microaddress sources. The stack unit includes a stack memory and a link memory. The link memory stores, for each target instruction, a predetermined number of preloaded microaddresses where each such microaddress specifies the address of one of a number of subroutines employed to execute a particular target instruction. Sequential microaddresses in the link memory are accessed to link the subroutines employed in the execution of each target instruction.

44 Claims, 10 Drawing Figures

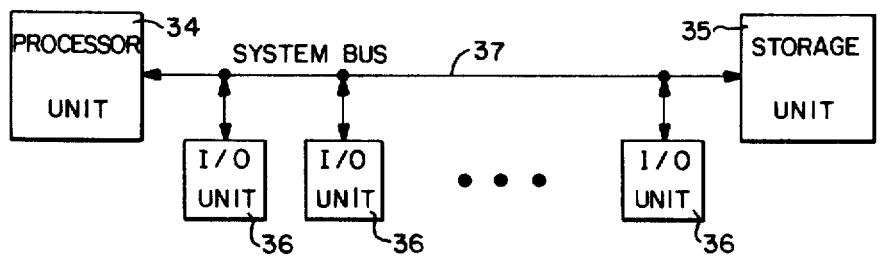
FIG.—1
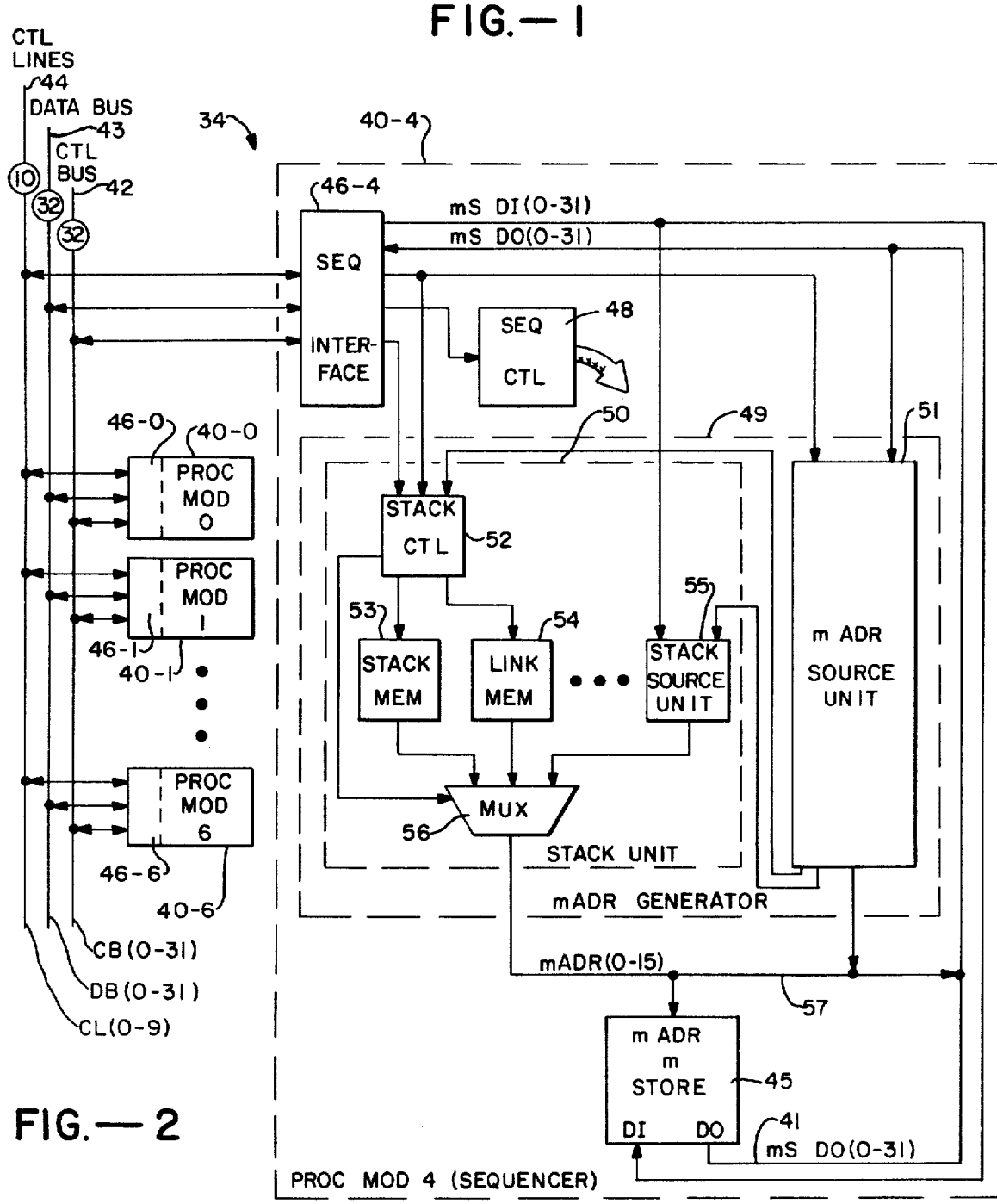
FIG.—2

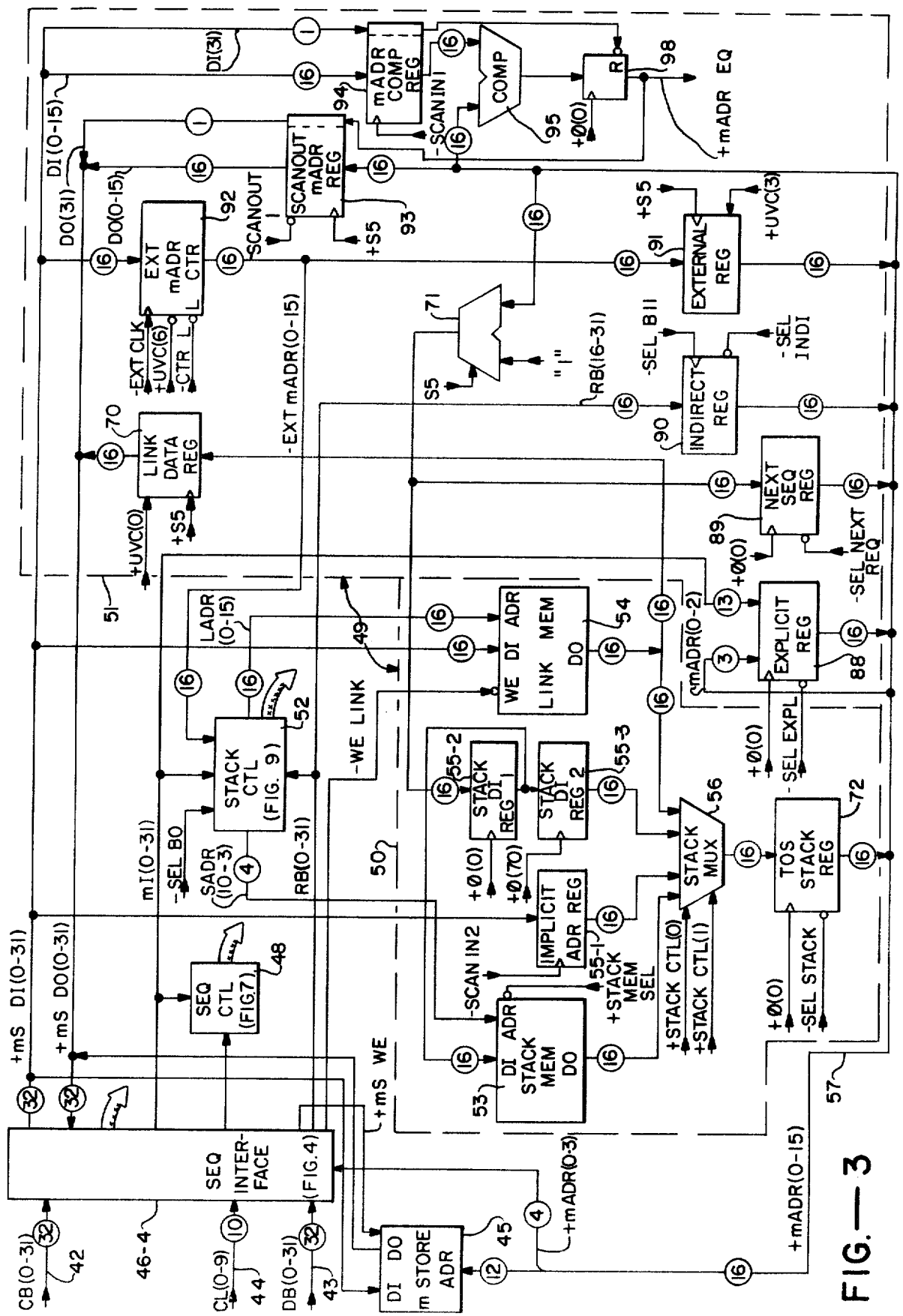
FIG.—3

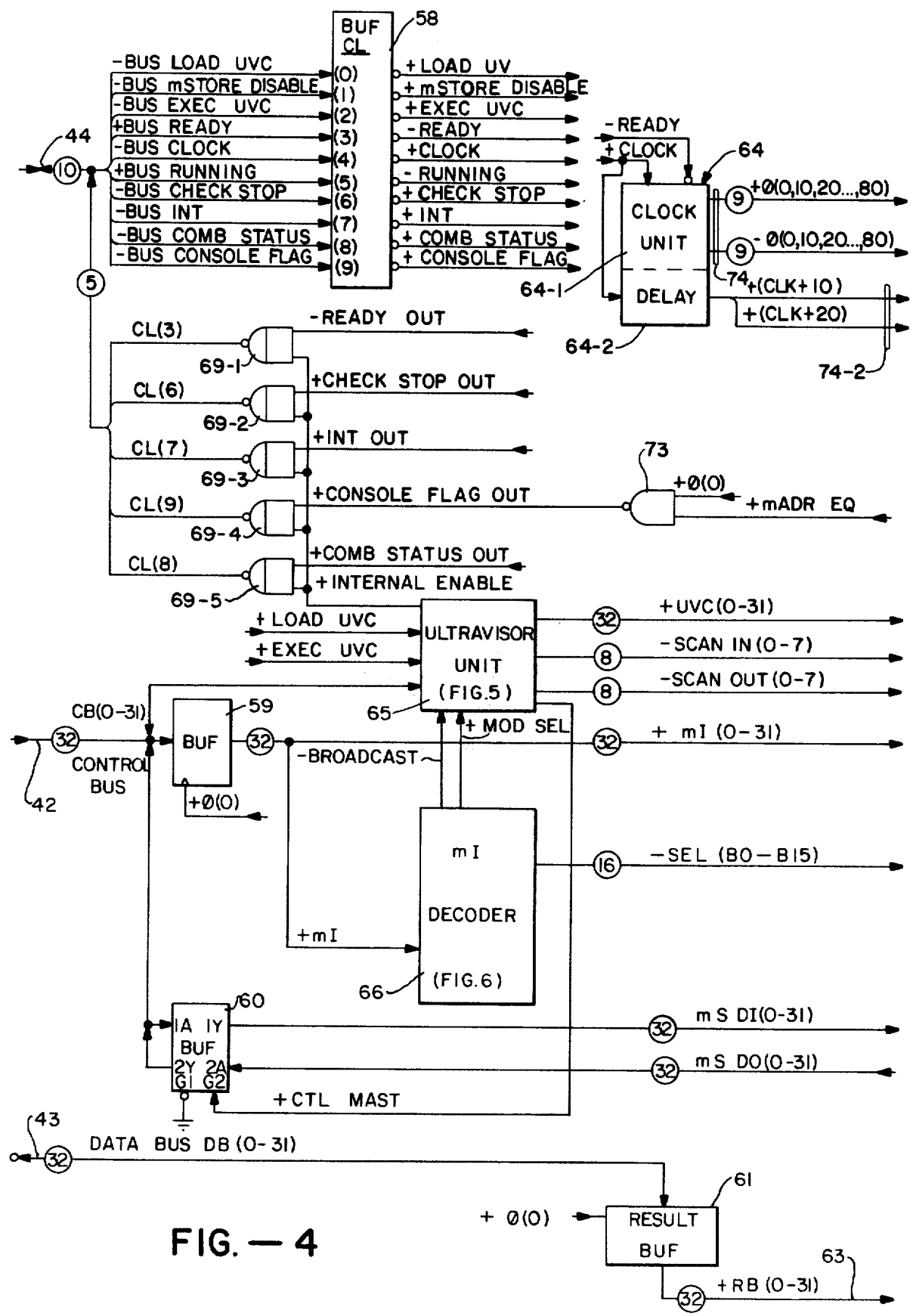
FIG. —4

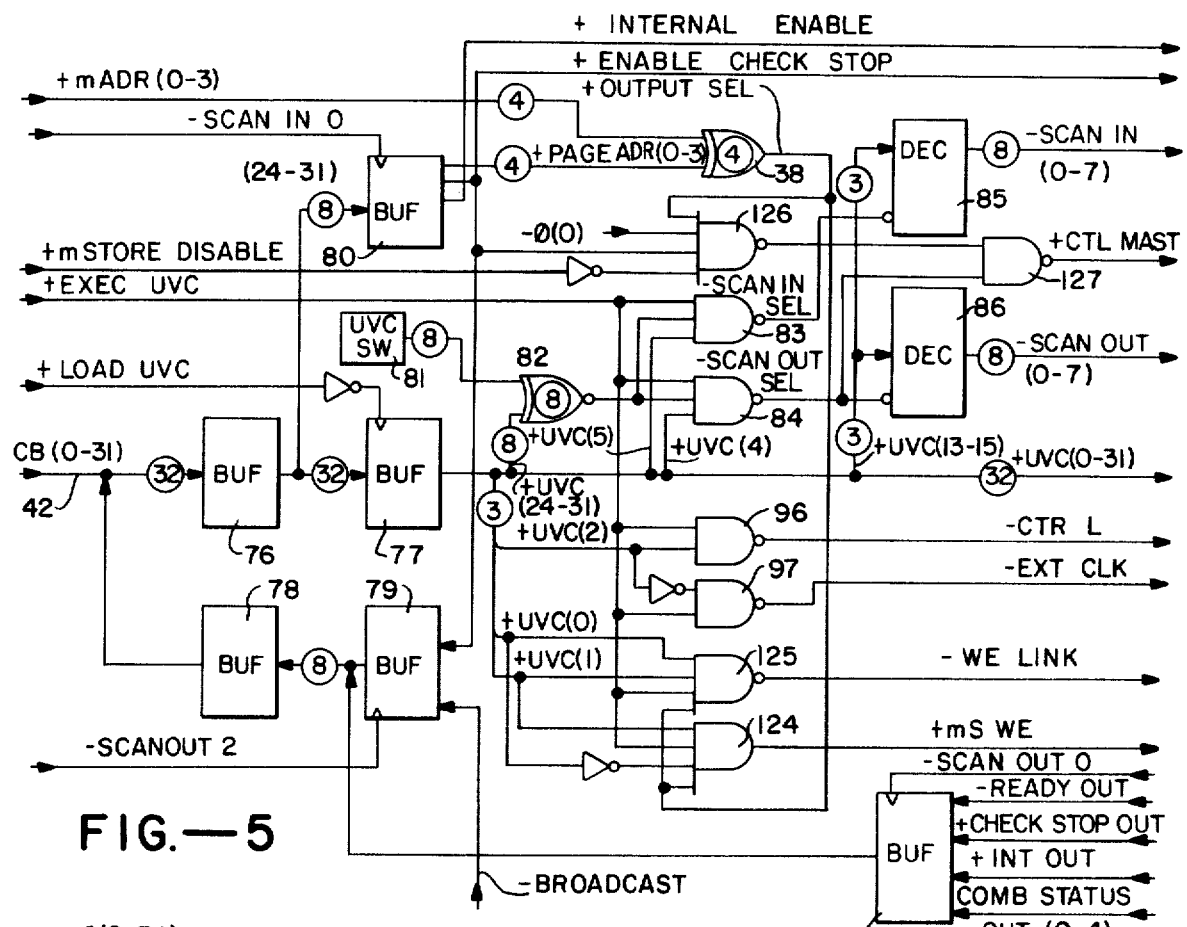
FIG.—5
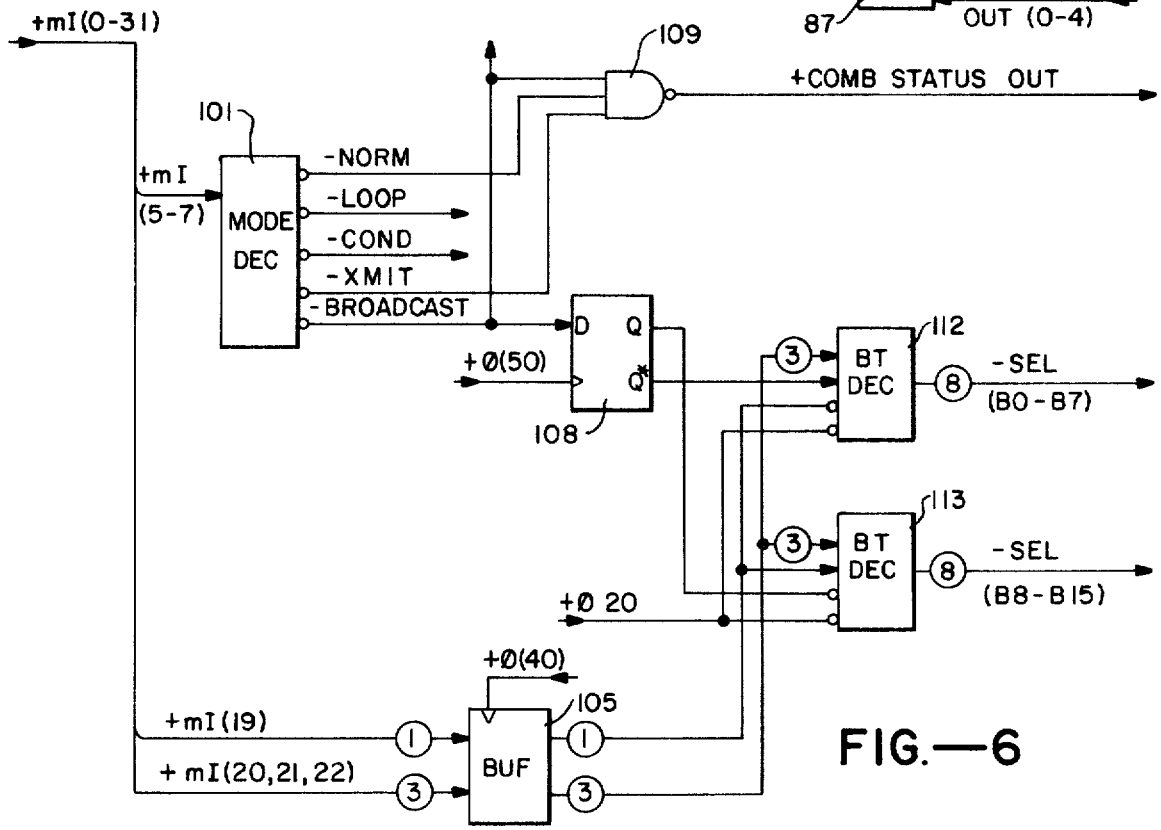
FIG.—6

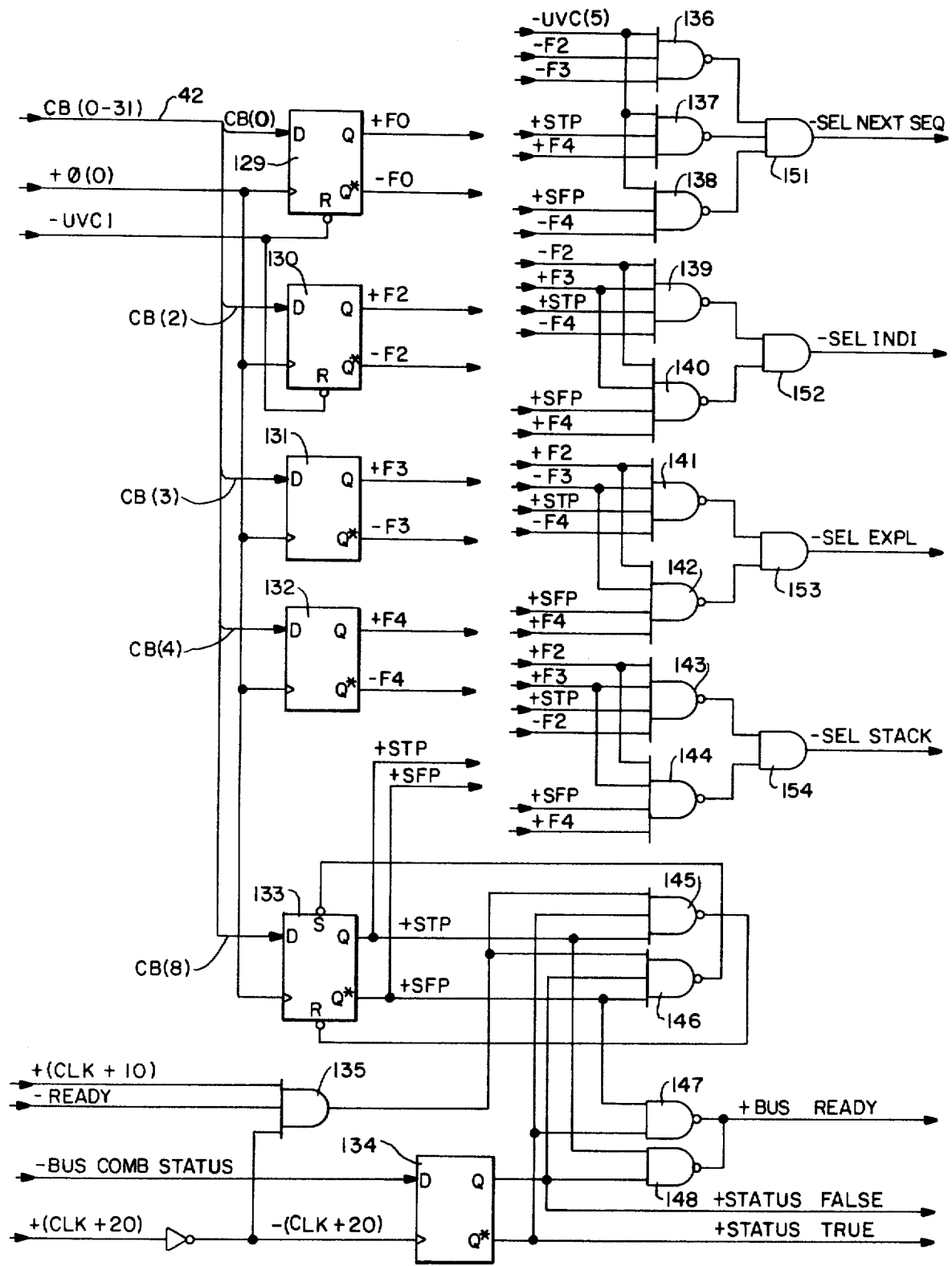
FIG.—7

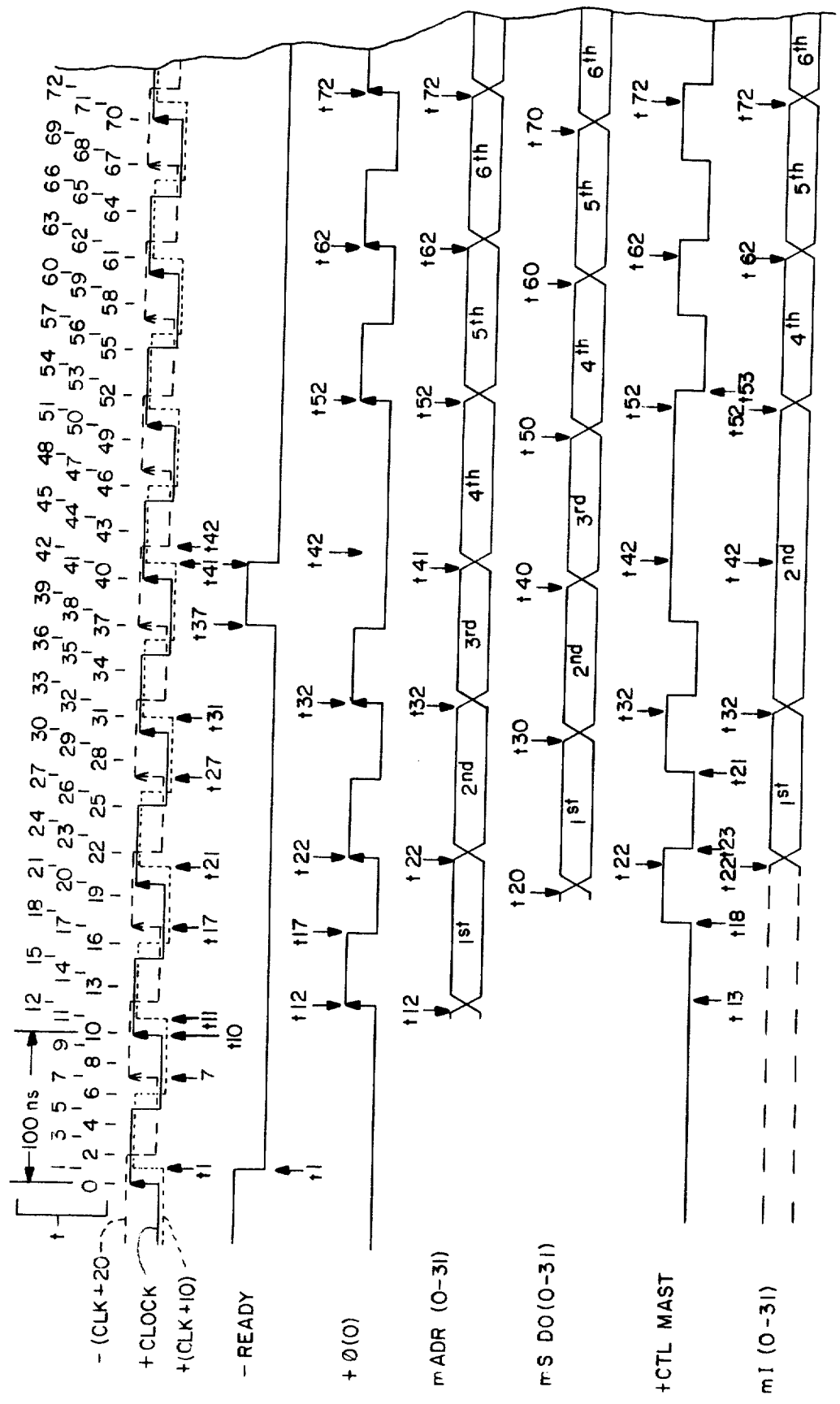
FIG.—8

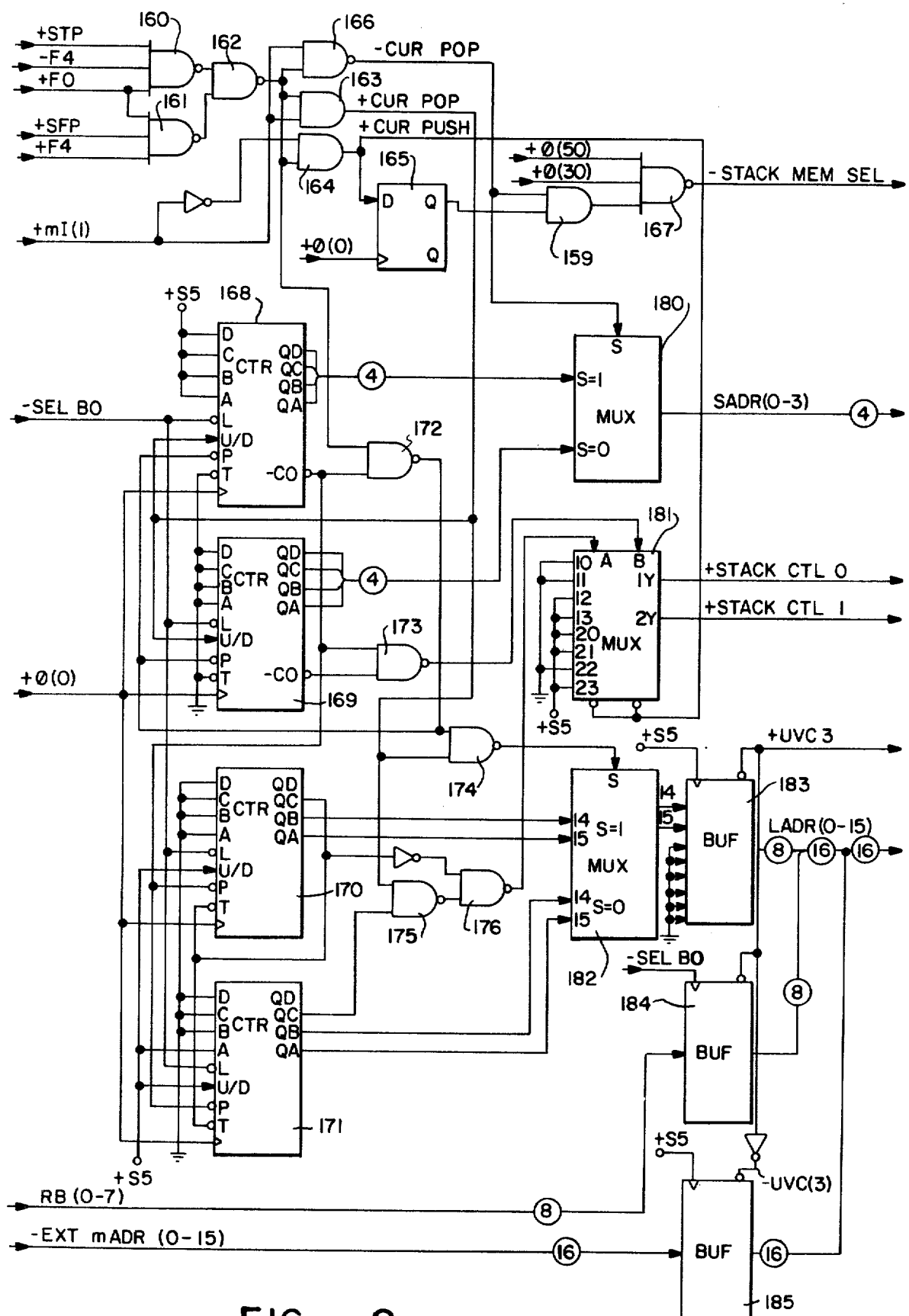
FIG.—9

COMPUTER AND METHOD FOR EXECUTING TARGET INSTRUCTIONS

BACKGROUND OF THE INVENTION

The present invention relates to the field of instruction-controlled digital computers and specifically to the processing units of digital computers.

Instruction-controlled digital computers execute instructions to carry out desired information manipulations. A group of instructions form a program. A program has its instructions sequentially executed by a digital computer, one or more at a time, to carry out the desired manipulations.

High-speed digital computers generally include one or more storage units for storing information, I/O units for communicating with input/output devices, a console for operator communication with the digital computer, and a processor unit for instruction execution.

In typical digital computers, information is supplied to and from the input/output devices from and to the remainder of the system through storage units. Typically, instructions to be executed are fetched from the storage unit by the processor unit. The fetched instructions are decoded to form control signals for controlling the execution of the instructions and thus for controlling various operations throughout the computer.

In establishing an architecture for a digital computer, economy of cost and speed of instruction execution are paramount considerations. The cost of the computer is related to the cost of the "hardware", that is, to the number and type of circuits employed and is related to the cost of the "software", that is, to the cost of providing the programs which are run by the computer. The performance of the computer is related to the speed with which the system can execute programs. The cost/performance ratio represents a figure of merit for a computer system. The lower the cost/performance ratio, the better the computer.

Another consideration in establishing the architecture for a particular digital computer system is compatibility with other digital computers and software. If compatibility with prior systems can be maintained, the software or other parts of prior systems can be beneficially retained. If compatibility with future systems can be readily achieved, then the useful life of a particular system can be extended.

Compatibility must be determined with reference to both hardware and software. Hardware compatibility requires that the apparatus in one digital computer be able to perform the same functions, either directly or indirectly by emulation, as the apparatus in another digital computer. Software compatibility requires programs executable on one digital computer to be executable on another digital computer.

Frequently, one digital computer called the target computer, is defined with an architecture including a certain number of functions to be performed using a particular set of target instructions. Frequently, another digital computer, called a host computer, is defined with an architecture which is designed to be compatible with the target computer. For compatibility, the host computer must emulate the target computer and thereby perform the same functions as the target computer and in so doing must execute programs written using the target instruction set.

When a host computer is designed to emulate a target computer, the host computer may operate with greater performance than or may cost less than the target computer. Such a host computer is an improvement over the target computer.

The IBM 370 computers are frequently target computers to be emulated by compatible host computers. The 370 computers are programmed with the 370 instruction set. A compatible host computer adapted to emulate a 370 computer performs the previously written 370 target programs avoiding or minimizing the necessity of reprogramming.

Prior art host digital computers have typically been designed using microinstructions to control the host computer. Such host digital computers operate, under microinstruction control, to execute each target instruction. The execution of a target instruction in a host computer typically requires the execution of a sequence of microinstructions in the host computer. When the sequence of microinstructions is executed, the result is execution of the target instruction.

The performance of the host computer in executing the target instruction is determined in part by the architecture of the host computer. In general, the host computer operates to fetch each target instruction. The operation code (Op Code) from the target instruction is employed by the host computer to develop a sequencing path to the microinstructions necessary to execute the target instruction. The necessary microinstructions are generally contained in a number of subroutines each subroutine including a series of microinstructions. These subroutines must be accessed and executed to cause execution of the target instruction.

One way of accessing the microinstruction subroutines in the host computer is by accessing a series of subroutine calls from a series of indirect addresses stored in the low-order locations of a microstore. The OP CODE from the target instruction to be executed is used to address the low-order locations of the microstore. The low-order locations of the microstore are preloaded with indirect addresses to provide jumps to call subroutines. Each indirect address specifies the location of a call subroutine unique to a particular target instruction. The call subroutine in turn contains a series of subroutine addresses which are accessed in sequence to call the subroutines necessary for executing the target instruction. In such an indirect address implementation, the number of microinstructions necessary to execute each target instruction is excessive because of the necessity of obtaining first the indirect address and thereafter the subroutine call addresses. The indirect address step requires at least one cycle of the host computer for each execution of a target instruction.

Another way of accessing the microinstruction subroutines in the host computer is to employ a separate addressable storage unit as a hardware jump table. The jump table provides a microaddress for addressing the microstore. The Op Code from the target instruction addresses the jump table directly to obtain the microaddress of a calling subroutine. That microaddress is used directly to address the microstore to access the call subroutine. The call subroutine in turn contains a series of subroutine microaddresses which are accessed in sequence to call the subroutines necessary to execute the target instruction. The use of a hardware jump table avoids the need for an additional indirect address cycle and thereby saves at least one cycle of the host computer for each execution of a target instruction.

Although the use of a hardware jump table eliminates one cycle of the host computer for each target instruction execution, the hardware jump table still requires execution of a call subroutine. For each call subroutine, the host computer normally must execute at least one call microinstruction which undesirably requires at least one cycle of the host computer. Such host computer cycles allocated to call subroutines necessarily degrade performance of the host computer in the execution of target instructions.

In digital computers in general, the task of calling and returning from subroutines has been widely examined. Stack computers are one type of digital computer which minimize the performance degredation caused by subroutine calls and returns. Stack computers are described, for example, in the May, 1977 issue of COMPUTER, Volume 10, Number 5, published by the IEEE Computer Society. While stack computers may have some advantage in terms of the efficiency in subroutine control, they have not been entirely satisfactory for a number of reasons such as their incompatibility with many types of digital computers and software. Such stack computers are generally incompatible with target computers such as the IBM 370 computers.

In view of the above background, there is a need for an improved digital computer having the flexibility to perform as a compatible host computer which efficiently emulates one or more selected target computers and which operates with an improved cost/performance ratio.

SUMMARY OF THE INVENTION

The present invention is an instruction-controlled digital computer and method of processing target instructions. The digital computer includes a processor unit for processing instructions. The processor unit is operated under the control of microinstructions. The processor unit includes a sequencer for generating sequences of microinstructions. Sequences of microinstructions are executed to cause execution of each target instruction.

The processor unit stores the microinstructions in a microstore. Sequences of microinstructions are accessed from the microstore under control of sequences of microaddresses. The sequences of microaddresses are generated by a microaddress generator which includes a plurality of microaddress sources. One of the sources of microaddresses is a stack unit.

The stack unit includes a stack memory and a link memory and a stack control unit. The stack control unit controls the selection of microaddresses from the stack memory and from the link memory.

The link memory is employed when the digital computer of the present invention operates as a host computer for executing target instructions. Target instructions are executed as a result of executing a plurality of microinstructions within the host computer. Each target instruction requires execution of a different sequence of microinstructions.

The sequence of microinstructions is determined, at least in part, for each target instruction by unique entries for each target instruction in the link memory. The link memory includes a plurality of unique locations for each one of the target instructions executable by the host computer. Whenever a target instruction is to be executed, the target instruction is employed to address its own unique locations in the link memory to provide one or more microaddresses. Those microaddresses from the link memory address subroutines of microinstructions in the microstore which must be executed in order to cause execution of the target instruction.

The microaddresses required in connection with the execution of any particular subroutine are loadable and retrievable from the stack memory within the stack unit or are otherwise available from other sources forming part of the microaddress generator. Whenever the stack memory is empty, the next link memory location associated with the particular target instruction being executed is accessed. The function of the link memory is to link the microinstruction subroutines for each target instruction without the need in many instances for use of a call subroutine. The link memory within the microaddress generator thus enhances the performance of the host computer in executing target instructions.

In accordance with one embodiment of the present invention, the stack unit includes, in addition to the stack memory and link memory, other sources of microaddresses. In one example, an implicit address register is employed to provide microaddress from the control bus when the available microaddresses from the link memory have been exhausted.

In accordance with one embodiment of the present invention, the microaddress generator includes a plurality of other sources for providing microaddresses to the microstore. A register is provided for selecting the next microaddresses explicitly from the current microinstruction. An adder is provided for incrementing each current microaddress by one to obtain the next sequential address for storage in a next sequential register. An indirect address register is provided for providing microaddresses indirectly from other parts of the processor unit. An external address register is provided for providing microaddresses externally from the processing unit.

In view of the above summary, the present invention achieves the objective of providing an improved digital computer having the flexibility to perform as a compatible host computer for emualting one or more selected target computers and which has an improved cost/performance ratio.

Additional objects and features of the present invention will appear from the following description in which the preferred embodiments of the invention have been set forth in detail in conjunction with the drawings.

BRIEF DESCRIPTION OF THE DRAWINGS

FIG. 1 is an overall block diagram of one digital computer suitable for employing the present invention.

FIG. 2 is a schematic block diagram of a processor unit in accordance with the present invention.

FIG. 3 depicts a more detailed electrical schematic representation of a sequencer module which forms part of the processor unit of FIG. 2.

FIG. 4 is an electrical schematic representation of an interface unit for interfacing the sequencer of FIG. 3 with other parts of the processor unit of FIG. 2.

FIG. 5 is an electrical schematic representation of an ultravisor unit which forms part of the interface unit of FIG. 4.

FIG. 6 depicts an electrical schematic representation of the microinstruction decoder which forms part of the interface unit of FIG. 4.

FIG. 7 depicts an electrical schematic representation of a sequencer control unit which forms part of the sequencer of FIG. 3.

FIG. 8 depicts waveforms representative of the operation of the sequencer of the present invention.

FIG. 9 depicts an electrical schematic representation of the stack unit control which forms part of the sequencer of FIG. 3.

DETAILED DESCRIPTION

Host Computer—FIG. 1

Figure 10:
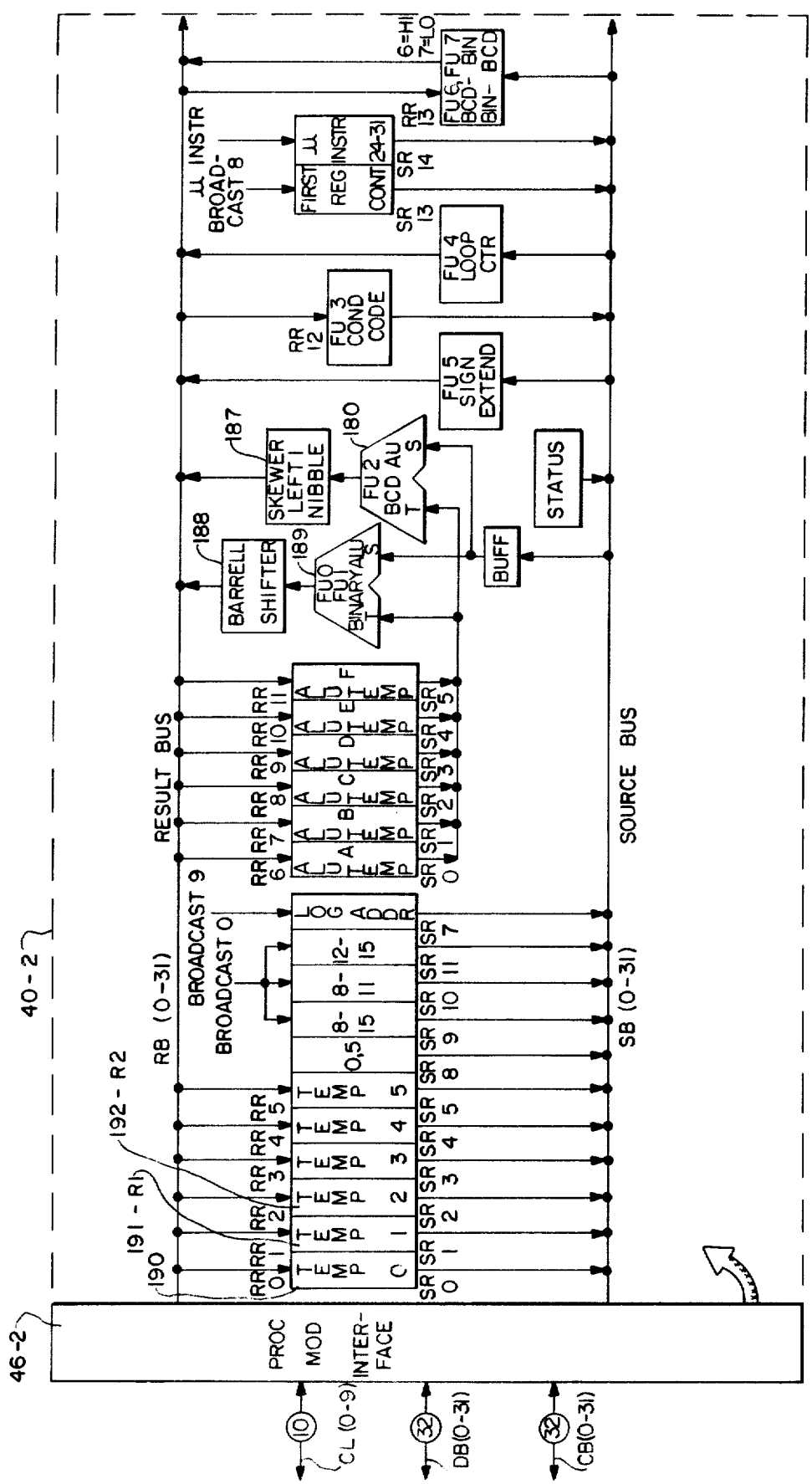
FIG. 10 depicts an electrical block diagram of an arithmatic and logic unit module which forms part of the processor unit of FIG. 2.

In FIG. 1, the schematic block diagram of a host computer is shown. The host computer includes a processor unit 34, a storage unit 35 and a plurality of input-/output (I/O) units 36. The units 34, 35 and 36 are interconnected by a system bus 37.

The input/output units typically include controllers and channels for communicating with input/output devices such as magnetic tape units, magnetic disc units and other peripheral units used with digital computers. In a typical system, an operator console is connected through one of the I/O units 36.

PROCESSOR UNIT—FIG. 2

In FIG. 2, the processor unit 34 of FIG. 1 is shown in further detail. In a preferred embodiment, the processor unit 34 is modular in form and includes the modules 40-0 through 40-6. The module 40-4 is a sequencer which is connected to the other parts of the processor unit by a control bus 42, a data bus 43 and control lines 44. The sequencer 40-4 functions to control the sequencing of microinstructions and thereby to control the operation of the processor unit.

The sequencer 40-4 controls the execution of target instructions fetched, for example, from the storage unit 35 of FIG. 1. Each target instruction is typically transmitted over the system bus 37 to a register (not shown) in the module 40-0. From module 40-0, target instructions are braodcast over data bus 43 to the sequencer 40-4 and the other modules of FIG. 2. The sequencer 40-4 thereafter generates sequences of microinstructions which are executed by the processor unit to result in the execution of each target instruction.

In FIG. 2, the sequencer 40-4 includes an interface 46-4 which connects to the control bus 42, the data bus 43 and the control lines 44. The interface 46-4 handles communications between the sequencer 40-4 and the other parts of the processor unit.

The sequencer 40-4 includes a microstore 45 for storing microinstructions. Microstore 45 is addressed by microaddress bus 57 and produces microinstructions. The microaddresses on bus 57 are derived from a microaddress generator 49. The microaddress generator 49 includes a stack unit 50 and a microaddress source unit 51. The stack unit 50 includes a stack memory 53, a link memory 54 and a stack source unit 55. A stack unit control 52 is provided to gate microaddresses from one of the sources 53, 54 and 55, by means of the multiplexer 56, to the microaddress bus 57.

The source unit 51 includes a number of different registers for providing microaddresses to the microaddress bus 57. A sequencer control 48 controls the selection of microaddresses from stack unit 50 and source unit 51.

The sequencer 40-4 is particularly suitable for sequencing microaddresses which address microinstructions which in turn are executed to cause execution of target instructions. Each target instruction to be executed is transmitted from the interface 46-4 under control of the stack unit control 52 as an input to the link memory 54. The link memory 54 provides an appropriate microaddress of a microinstruction subroutine in the microstore 45. Each subroutine from the microstore 45 is executed and that execution forms part of the execution of the target instruction.

The link memory 54 includes a plurality of unique microaddresses for each target instruction. In one example, the link memory 54 includes up to four microaddresses for each one of 256 target instructions. Each microaddress in link memory 54 identifies the starting location of a subroutine of microinstructions in microstore 45. The microinstructions in a subroutine in microstore 45 are located in contiguous storage locations starting with the storage location identified by the microaddress from link memory 54. The stack memory 53 is used during subroutine execution by pushing microaddresses into the stack and then popping those microaddresses from the stack. When the stack memory 53 is empty of microaddresses the stack control unit 52 selects the link memory 54 or the stack source unit 55.

In operation, a target instruction initially addresses link memory 54 to obtain the first microaddress of a subroutine in the microstore 45. After execution of each subroutine, stack unit control 52 accesses from link memory 54 the next sequential microaddress in order to obtain the starting location of the next subroutine in the microstore 45 which is necessary in connection with execution of the target instruction.

In this manner, the stack unit 50 calls subroutines from the microstore 45 without need for executing a separate call subroutine. The sequencer 40-4 efficiently controls the execution of each target instruction by the execution of a plurality of microinstructions.

SEQUENCER—FIG. 3

In FIG. 3, further details of the sequencer 40-4 portion of the processor 34 of FIG. 2 are shown. The sequencer 40-4 includes the sequencer interface 46-4 (described in connection with FIGS. 4, 5 and 6), the sequencer control 48 (described in connection with FIG. 7), the stack control 52 (described in connection with FIG. 9), the microstore 45, and the microaddress generator 49.

The sequencer 40-4 includes the microstore 45 for storing microinstructions. In a typical example, microstore 45 is a random access memory which stores up to 4,096 microinstructions each of 32 bits. The microinstruction locations are addressed in microstore 45 by 12 bits, mADR(4-15), of a 16-bit microaddress appearing on the microaddress bus 57, mADR(0-15). The addressed microinstructions appear on the 32-bit microstore data out bus 41, mS DO(0-31), from the microstore 45. In order to store microinstructions into microstore 45, the +mS WE line from interface 46-4 is enabled. When thus enabled for a write, the microinstruction from the data in bus, mSDI(0-31) is stored at the location specified by the address bits mADR(4-15).

In the sequencer 40-4, the microaddress generator 49 is shown enclosed in broken lines partitioned into the stack unit 50 and a microaddress source unit 51.

In the stack unit 50, the stack memory 53 is, in one embodiment, a random access memory for storing up to sixteen 16-bit microaddresses. The stack memory 53 is addressed, for storing and fetching, by the 4-bit stack address bus, SADR(0-3), from the stack control 52. Microaddresses are stored into the stack memory 53 from register 55-3 by way of the data in (DI) port when the −STACK MEM SEL line from the control 52 is enabled. Microaddresses are fetched from the stack memory 53 by way of the data out (DO) port.

In FIG. 3, the link memory 54, in one embodiment, is a random access memory having its locations addressed by the 16-bit address bus, LADR(0-15), from the stack control 52. The link memory 54 stores a plurality of microaddresses for each of a number of target instructions. In one example in which up to 256 target instructions are possible, the link memory 54 stores up to 4 microaddresses for each of the possible 256 target instructions. During usual operation, the microaddresses in the link memory 54 are not altered in connection with the execution of target instructions. However, in order to initially load the link memory 54 and to add new target instructions or alter existing target instructions, microaddresses can be loaded into the link memory via the DI port which connects from the microstore data in bus, mSDI(0-31). In order to write new microaddresses into the link memory 54, the −WE LINK signal from the interface 46-4 is enabled. The microaddresses accessed from the link memory 54 appear on the DO port which connects as an input to the stack multiplexer 56 and to a link data register 70.

The stack unit 50 includes additional sources of microaddresses including an implicit address register 55-1 and stack data in registers 55-2 and 55-3. The implicit address register 55-1 is connected to receive microaddresses from the microstore data in bus, mSDI(0-31), of the sequencer interface 46-4, whenever the −SCAN IN 2 line is enabled. The output from the implicit address register 55-1 connects as one of the inputs to the stack multiplexer 56. The stack data in register 55-2 is clocked by the clock signal +φ(0) to store the next sequential address which is derived from an adder 71. The output from register 55-2 connects to the input of register 55-3 and also connects to the DI port of the stack memory 53. At the +φ(70) clock signal, the contents of the register 55-2 are stored in the register 55-3. The register 55-3 provides one of the inputs to the stack multiplexer 56.

In FIG. 3, the stack multiplexer 56 functions to select a microaddress from one of four sources, namely, stack memory 53, link memory 54, implicit address register 55-1 and stack data in register 55-3. The stack multiplexer 56 selects one of the four sources in response to signals on the control lines +STACK CTL(0) and +STACK CTL(1). The selected one of the microaddresses by multiplexer 56 is loaded into the stack register 72 by the clock signal +φ(0).

The output from the stack register 72 onto the microaddress bus 57, mADR(0-15), occurs under the control of the −SEL STACK signal. The −SEL STACK signal is derived from the sequencer control unit 48.

In FIG. 3, the microaddress generator 49 includes the microaddress source unit 51 which includes a number of registers. Specifically, an explicit register 88 is loaded by the clock signal +φ(0) with the 13-bit field mI(19-31) from the microinstruction bus, mI(0-31), from the sequencer interface 46-4 and the high-order 3-bit field mADR(0-2) from the microaddress bus 57. The microaddress in register 88 is gated onto the microaddress bus 57, mADR(0-15), under control of the −SEL EXPL signal from the sequencer control 48.

The source unit 51 includes the next sequential register 89 which is loaded by the +φ(0) clock signal with the next sequential microaddress from the microaddress adder 71. The microaddress in register 89 is gated onto the microaddress bus 57 under control of the −SEL NEX SEQ signal from the sequencer control 48.

An indirect register 90 is connected to the 16-bit field of the result bus, RB(16-31). Information from the result bus is clock into the register 90 under control of the −SEL B11 which is one of the outputs from the sequencer interface 46-4. The microaddress in the register 90 is gated to the microaddress bus 57 under control of the −SEL INDI signal from the sequencer control 48.

An external register 91 is loaded with an external microaddress from the external microaddress counter 92. The microaddress from register 91 is gated onto the microaddress bus under control of the +UVC 3 signal from the sequencer interface 46-4.

The external microaddress counter 92, counts transitions of the −EXT CLK signal when enabled by the +UVC(6) control signal from the interface 46-4. The counter 92 is loaded with a count from the microstore data in bus, mSDI(0-15), under command of the −CTR L signal from interface 46-4.

The microaddress bus 57, mADR(0-15), connects as an input to the microstore 45 [the field mADR(4-15)], to the interface 46-4 [the field mADR(0-3)], to the next sequential adder 71, to the scan out microaddress register 93 and to the comparator 95.

The next sequential adder 71 takes the current microaddress on the microaddress bus 57 and adds 1 to it to provide the next sequential microaddress. That next sequential microaddress is stored by the +φ(0) clock signal in both the next sequential register 89 and the stack data in register 55-2.

The scan out microaddress register 93 stores the current microaddress provided by bus 57. The current microaddress in register 93 is gated to the sequencer interface 46-4 over a portion of the microstore data out bus, mS DO(0-15), under control of a −SCAN out 1 signal from the sequencer interface 46-4.

The comparator 95 compares the current microaddress on the bus 57 with a microaddress in a microaddress compare register 94. An address to be compared with the current microaddress is loaded into the microaddress compare register 94 over a portion of the microstore data out bus, mSDO(0-15), under the control of −SCAN IN 1 signal from the sequencer interface 46-4. The compare signal output from the comparator 95 is stored in the 1-bit register 98 by the +φ(0) signal to indicate by the +mADR EQ signal when the current microaddress on bus 57 is the same as the microaddress loaded into the compare register 94. Register 98 is reset by DI(31) bit from register 94. The +mADR EQ output connects to bit 31 of register 93 and to the sequencer interface 46-4.

The link data register 70 stores the most recent microaddress output from the link memory 54. The microaddress in register 70 is made available to a portion of the microstore data out bus, mS DO(16-31), under control of the +UVC(0) signal from the sequencer interface 46-4.

INTERFACE UNIT—FIG. 4

In FIG. 4, further details of the interface unit 46-4 of FIGS. 2 and 3 are shown. The ten control lines 44 connect as inputs to a buffer 58 and are named −BUS LOAD UVC, −BUS mSTORE DISABLE, +BUS READY, −BUS CLOCK, +BUS RUNNING, −BUS CHECK STOP, −BUS INT, −BUS COMB STATUS, and −BUS CONSOLE FLAG. The signals on the lines 44 are immediately latched in the buffer 58. The foregoing signals from the lines 44 are inverted by the buffer 58 to provide control signals for the sequencer 40-4 having the same name without the word "BUS" and having opposite polarity.

In addition to the input signals from the lines 44, NAND gates 69-1 through 69-5 provide output connections to the lines 44 where lines of an identical name (ignoring "BUS" and "OUT") are connected through the gates 69. Gates 69 are enabled to connect the "OUT" signals to the lines 44 under control of the +INTERNAL ENABLE signal from the microinstruction decoder 66. The +CONSOLE FLAG OUT signal is provided by NAND gate 73 which receives the +$\phi(0)$ and +mADR EQ signals.

In FIG. 4, the interface includes a clock unit 64 including two parts 64-1 and 64-2. The clock unit part 64-1 receives the +CLOCK signal from the buffer 58 and responsively provides 18 clock lines 74 with various delayed clock signals for clocking circuits throughout the sequencer 44 of FIG. 2. The clock unit 54 provides the clock signals on lines 74 under control of the −READY signal from the buffer 58. Clock unit 64 is a conventional device for providing clock signals at the frequency determined by the +CLOCK signal. In one embodiment, the +CLOCK signal has a 100 nanosecond period. The outputs from the clock unit 64 include the nine clock signals +$\phi(0, 10, 20, \ldots, 80)$. Those nine signals have the same period as the "CLOCK signal. The +$\phi(0)$ signal is a signal which has, in a particular example, a 20 nanosecond delay after the +CLOCK signal. The +$\phi(10)$ signal is delayed ten nanoseconds after the +$\phi(0)$ signal. In a similar manner, each of the signals +$\phi(20)$, +$\phi(30)$, ... +$\phi(80)$ are successively delayed by increments of ten nanoseconds from the preceeding signal. The nine clock signals −$\phi(0)$, −$\phi(10)$, −$\phi(20)$, ... −$\phi(80)$ have the same timing as the +$\phi(0)$, +$\phi(10)$, +$\phi(20)$, ... +$\phi(80)$ signals with the inverted sign. The 18 output signals from the clock unit 64 are available for distribution throughout the sequencer 40-4 of FIGS. 2 and 3 whenever the −READY signal is a logical 0.

The clock unit part 64-2 is a delay device which delays the +CLOCK signal by 10 and 20 nanoseconds to provide the +(CLK +10) and the +(CLK +20) signals, respectively, on lines 74-2 irrespective of the logic level of the −READY signal.

In FIG. 4 the 32-bit control bus 42, CB(0-31), connects as an input to the buffer 59. Buffer 59 latches the information on bus 42 under control of the +$\phi(0)$ clock signal from the clock unit 64. The 32-bit output from buffer 59 forms the microinstruction bus, mI(0-31), which is connected throughout the sequencer 40-4 of FIGS. 2 and 3. In particular, the microinstruction bus from the buffer 49 is connected as an input to the microinstruction decoder 66. The microinstruction decoder 66 functions to decode selected fields from the microinstruction bus for providing decoded output signals throughout the sequencer 40-4. The microinstruction decoder 66 is enabled to perform decoding upon being enabled by the +INTERNAL ENABLE signal from an ultravisor unit 65. When enabled, the decoded output from decoder 66, in the present example, is the 16-bit bus −SEL (B0-B15).

In FIG. 4, the control bus 42 also connects as an input to the ultravisor unit 65. The ultravisor unit 65 functions to perform various supervisory functions throughout the sequencer. The information on the control bus 42 is loaded into the ultravisor unit 65 under control of the +LOAD UVC signal from the buffer 48. Upon loading the control information from the control bus 42, the ultravisor unit 65 provides those signals as an output on the 32-bit ultravisor control bus +UVC(0-31). Additionally, upon the +EXEC UVC signal from the buffer 58, the ultravisor unit 65 functions to provide scan in or scan out signals on the 8-bit bus −SCAN IN(0-7) or on the 8-bit bus −SCAN OUT(0-7).

In FIG. 4, the 32-bit data bus 43 is connected as an input to the result buffer 61. Information from the bus 43 is clocked into the buffer 61 under control of the $\phi(0)$ clock signal. The output from the result buffer 61 is the 32-bit result bus 63, +RB(0-31).

In FIG. 4, the control bus 42 connects to the buffer 60. Buffer 60 stores the information on control bus 42 to provide the output data on the microstore data in bus, mS DI(0-31). When the −CTL MAST signal is present, the buffer 60 storing information from the microstore data out bus, mS D0(0-31), makes that information available on the control bus 42.

ULTRAVISOR UNIT—FIG. 5

In FIG. 5, the ultravisor unit 65, which forms part of the interface of FIG. 4 is shown in further detail. In FIG. 5, the current information on control bus 42, CB(0-31), is loaded into the input buffer 76. Additionally, information is returned to the control bus 42 from the buffer 68. The information stored in buffer 76 is loaded into the buffer 77 under control of the +LOAD UVC signal from the buffer 58 in the interface of FIG. 4. The output from the buffer 77 is the ultravisor control bus, +UVC(0-31). Various ones of the 32 bits of the ultravisor control bus are employed for providing command signals for supervising the operation of the sequencer of FIG. 3.

The ultravisor command format is given in the following CHART 0.

| UVC (0-31) BIT | Ultravisor Command Format | |
|---|---|---|
| 0 | 0 = mStore | 1 = Link Memory |
| 1 | 0 = Read | Write |
| 2 | 0 = Hold External mADR | 1 = Load external mADR |
| 3 | 0 = Sequencer enable | 1 = External enable |
| 4 | 0 = Normal | 1 = Scan out |
| 5 | 0 = Normal | 1 = Scan in |
| 6 | 0 = Inc external mADR | 1 = Hold external mADR |
| 7-12 | NOT USED | |
| 13 | Scan Type | 0 |
| 14 | Scan Type | 1 |
| 15 | Scan Type | 2 |
| 16-23 | NOT USED | |
| 24 | Configuration Number | 0 |
| 25 | Configuration Number | 1 |
| 26 | Module Type | 0 |
| 27 | Module Type | 1 |
| 28 | Module Type | 2 |
| 29 | Module Type | 3 |
| 30 | Module Type | 4 |
| 31 | Module Type | 5 |

In CHART 0, the +UVC(0) bit is a logical 0 to enable the microstore 45 and is a logical 1 to enable the link memory 54. In FIG. 5, the +UVC(0) line connects to the NAND gate 125 and is inverted and connected to the AND gate 124. The +UVC(1) bit connects as an input to both the NAND gate 125 and the AND gate 124. Whenever +UVC(0) is a logical 0, gate 124 is enabled and whenever +UVC(0) is a logical 1, gate 125 is enabled.

The +UVC(1) bit enables the reading or writing of both the microstore 45 and the link memory 54. If UVC(1) is a logical 1, gates 124 and 125 in FIG. 5 are both enabled. When gates 124 and 125 are also energized with the +OUTPUT SEL and the +EXECUTE UVC signals they are enabled to produce the −WE LINK and the +mSWE signals as a function of +UVC(0) signal.

In CHART 0, the +UVC(2) bit when a logical 0 causes the external microaddress in the counter 92 of FIG. 3 to be held at its current state and when a logical 1 to be loaded with the contents of the mSDO(0-15) bus. To perform these functions, the +UVC(2) bit connects as an input to NAND gate 96 and is inverted to connect as an input to NAND gate 97 in FIG. 5. Gates 96 and 97 are both enabled by the +EXECUTE UVC signal. When gate 96 is satisfied to produce a 0 output, the −CRT L line causes counter 92 in FIG. 3 to be parallel loaded from the mSDI(0-15) bus. When gate 97 is satisified, a clock signal −EXT CLK is applied to the counter 92 of FIG. 3. Counter 92 is incremented by that clock signal provided the +UVC(6) bit enables counter 92.

The +UVC(3) bit connects to the external register 91 in FIG. 3 and to the buffer stores 183 and 184 of FIG. 9 and is inverted to connect to the buffer store 185 in FIG. 9. Whenever +UVC(3) is a logical 0, the buffer stores 183 and 184 in FIG. 9 are enabled and the buffer store 185 in FIG. 9 and the external register 91 in FIG. 3 are disabled. Whenever +UVC(3) is a logical 1, the opposite registers are enabled and disabled.

The +UVC(4) bit when a logical 0 causes the normal state and when a logical 1 causes a scan out state. The +UVC(4) line from buffer 77 connects as an enabling input to the NAND gate 84.

The +UVC(5) bit when a logical 0 causes the normal state and when a logical 1 causes a scan in. The +UVC(5) bit connects as an enabling input to the NAND gate 83.

In CHART 0, the +UVC(6) bit connects as an input to the gate input of the external microaddress counter 92 of FIG. 3. Whenever the +UVC(6) bit is a logical 0, counter 92 is enabled to count the clock pulse provided from the NAND gate 97 of FIG. 5. Whenever a logical 1, the counter 92 is disabled and holds the current external microaddress.

In CHART 0, the bits 7 through 12 are not used.

In CHART 0, the +UVC(13-15) field contains an encoded scan type which is input to the decoders 85 and 86 of FIG. 5.

In CHART 0, the bits 16 through 23 are not used.

The 8-bit field +UVC(24-31) is a configuration and module identifier input to an 8-way EXCLUSIVE-OR gate 82. Gate 82 compares the +UVC(24-31) bits with eight signals from an ultravisor switch 81. Whenever the signals are the same, gate 82 provides an output signal. Switches 81 are eight manually or otherwise settable switches. The switches 81 in each of the modules 40-0 through 40-6 of FIG. 2 are set to different values so that each of the ultravisor modules can be distinguished. Whenever the gate 82 detects identity between the signals from the buffer 77 and from the switch 81, an output signal enables the NAND gates 83 and 84. Gate 83 must also be enabled by the +UVC(5) signal and gate 84 must be enabled by the +UVC(4) signal. The third enabling input to the gates 83 and 84 is the +EXEC UVC signal from the buffer 58 of FIG. 4.

When gate 83 is satisfied, it produces the −SCAN IN SEL signal which enables the decoder 85. Decoder 85 when thus enabled decodes the 3-bit signal +UVC(13-15) to provide one of eight scan in signals. The eight signals are −SCAN IN(0-7).

Whenever the gate 84 is satisfied, the −SCAN OUT SEL signal enables the decoder 86. Decoder 86 when thus enabled decodes the 3-bit scan field +UVC(13-15) to provide one of eight scan out signals. Those eight signals are—SCAN OUT(0-7).

The signals from the decoders 85 and 86 and from the buffers 77 and 80 are available for controlling operations throughout the sequencer of FIG. 3. In addition to output signals, the buffer 87 accepts signals from various parts of the sequencer of FIG. 3 along with buffer 79 for loading into the buffer 78. The signals are loaded into buffer 87 under control of the −SCAN OUT 0 signal from decoder 86. The signals are loaded into buffer 79 under control of the −SCAN OUT 2 signal from the decoder 86. Additional scan out signals, not shown, such as parity error or other similar signals can be transmitted through buffers to the control bus 42 if desired.

By way of summary, the general operation of the FIG. 5 ultravisor unit is to accept information from the control bus 42 under a +LOAD UVC signal from the interface of FIG. 4. If the FIG. 5 ultravisor is the one being identified by the +UVC(24-31) bits, then the gate 82 will signal the gates 83 and 84 that an ultravisor commanded operation is to be carried out. Such an operation will be carried out upon the +EXEC UVC signal being received from the interface of FIG. 4. The operation to be supervised by the ultravisor of FIG. 5 is the scan in of information to the sequencer of FIG. 4, the scan out information to the sequencer interface, or some other supervisory function.

MICROINSTRUCTION DECODER—FIG. 6

In FIG. 6, further details of the microinstruction decoder 56 of FIG. 4 are shown. The decoder of FIG. 6 receives selected ones of the bits from the microinstruction bus, +mI(0-31). More specifically, a decoder 101 accepts the inputs +mI(5-7) and enables one of five outputs. Those five outputs are −NORM, −LOOP, −COND, −XMIT and −BROADCAST. These output signals from the decoder 101 represent the various classes of microinstructions which are employed in the processor unit of the present digital computer. In the particular decoder of FIG. 6, the −LOOP and the −COND signals are not actually employed.

The −BROADCAST signal is connected to the D input of a conventional flip-flop 108 and to NAND gate 109. Flip-flop 108 is clocked by the +φ(50) signal. The Q output of flip-flop 108 enables a decoder 113 and the Q* output enables a decoder 112. Decoder 112 and 113 function to decode the 3-bit microinstruction field +mI(20-22) stored in buffer 105 by the clock signal +φ(40). Decoder 112 and 113 are also enabled by the microinstruction bit +mI(19) also stored in buffer 105. Decoders 112 and 113 are enabled by the clock signal +φ(20) which is the following clock cycle after the buffer 105 is loaded. The decoder 112 decodes the 3-bit signal to produce one of eight output signals, −SEL(B0-B7). In a similar manner, the decoder 113 decodes the 3-bit input signal, when enabled, to produce one of eight output signals, −SEL(B8-B15).

The NAND gate 109 detects the absence of a −NORM, a −XMIT and a −BROADCAST signal to produce the −COMB STATUS OUT signal.

SEQUENCER CONTROL—FIG. 7

In FIG. 7, the sequencer control 48 of FIG. 3 is shown in greater detail. The sequencer control of FIG. 7 receives the control bus 42 and other control signals from the sequencer interface 46-4 of FIG. 2. From control bus 427, the CB(0) signal is input to the flip-flop 129, the CB(2) signal is input to the flip-flop 130, the CB(3) signal is input to the flip-flop 131, the CB(4) signal is input to the flip-flop 132 and the CB(8) signal is input to the flip-flop 133. All of the flip-flops 129 through 133 are clocked to store the respective signals on the bus 42 by the +φ(0) clock signal.

Flip-flop 129 provides on its Q and Q* outputs the +F0 and −F0 signals, respectively. Flip-flop 130 provides on its Q and Q* outputs the +F2 and −F2 signals, respectively. Both flip-flops 129 and 130 are reset by a −UVC(1) signal.

The flip-flop 131 provides on its Q and Q* outputs the +F3 and −F3 signals, respectively. Flip-flop 132 provides on its Q and Q* outputs the signals +F4 and −F4, respectively.

Flip-flop 133 is a predicted status store which is program settable by the CB(8) bit. Flip-flop 133 has Q and Q* outputs which designate the true path signal, +STP, and the false path signal, +SFP, respectively.

The various output signals from the flip-flops 129 through 133 are decoded by the NAND gates 136 through 148 and the AND gates 151 through 154 in a manner which is apparent from FIG. 7. The decoding is carried out to select one of four registers as the source of the next microaddress which is gated onto the microaddress bus 47 for addressing the microstore 45 of FIG. 3.

In FIG. 7, the AND gate 151 combines the outputs from gates 136 through 138 to provide the −SEL NEXT SEQ signal for selecting the microaddress from the next sequential register 89 in FIG. 3.

The AND gate 152 combines the outputs from gates 139 and 140 to provide the −SEL INDI signal for selecting the indirect register 90 in FIG. 3.

The AND gate 153 combines the outputs from gates 141 and 142 to provide the −SEL EXPL signal for selecting the explicit register 88 in FIG. 3.

The AND gate 154 combines the outputs from gates 143 and 144 to provide the −SEL STACK signal for selecting the stack register 72 in FIG. 3.

In FIG. 7, the flip-flop 134 is employed to store the actual status of the sequencer.

The actual status appearing on the −BUS COMB STATUS line is stored, via the D input of flip-flop 134, during positive-going transitions of by the −(CLK +20) signal formed by inverting the +(CLK +20) signal. The Q and Q* outputs from flip-flop 134 are the +STATUS FALSE and +STATUS TRUE signals, respectively. The NAND gate 147 compares the Q* outputs and the NAND gate 148 compares the Q outputs of flip-flops 133 and 134. The outputs from NAND gates 147 and 148 are connected in common to form the +BUS READY line. Gates 147 and 148 function to provide the +BUS READY signal as a logical 1 whenever flip-flops 133 and 134 store the same status state and a logical 0 whenever they do not store the same status state.

In FIG. 7, NAND gate 145 is connected to reset flip-flop 133 to the same status state as flip-flop 134 when enabled by the NAND gate 135. Similarly, NAND gate 146 is connected to set flip-flop 133 to the same status state as flip-flop 134 whenever enabled by gate 135. Only one of the gates 145 or 146 is operative to set or reset flip-flop 133 whichever is required. The gates 145 and 146 are enabled by a logical 1 output from the NAND gate 135. Gate 135 is enabled during the CLK+10 through CLK+20 times during each period of the clock signal. If, during this period, the sequencer is not ready, as indicated by a logical 1 for the −READY signal, then gate 135 will be satisfied to enable gates 145 and 146 to set or reset flip-flop 133. If during this period, the system is ready as indicated by a logical 0 for the −READY signal, then gate 135 will not be satisfied and gates 145 and 146 are not enabled. The −READY signal is the +BUS READY signal output from the gates 147 and 148 after being latched and inverted in the buffer 58 of FIG. 4.

In FIG. 7, the NAND gate 126 is satisfied to produce a 0 output by the simultaneous presence of a +OUTPUT SEL, −φ(0), −mSTORE DISABLE, and +INTERNAL ENABLE signals all as logical 1's. A 0 from gate 126 forces the NAND gate 127 to a logical 1 output. Gate 127 can also be forced to a 1 output by the −SCAN OUT SEL signal from gate 84 of FIG. 5. When gate 127 has a 1 output, the +CTL MAST signal causes the microinstruction from the microstore 45, on bus mSD0(0-31), to be gated through the output buffer 60 of FIG. 4.

FIG. 8—MICROINSTRUCTION FETCHING

In FIG. 8, waveforms representative of the operation of the predicted status and the current status controls of FIG. 7 are shown.

The +CLOCK waveform in the embodiment described has a 100 nanosecond period. The first positive-going transition of the +CLOCK signal occurs at t0, the first negative-going transition occurs at t5 and the next positive-going transition occurs at t10. The +CLOCK signal is continuous and establishes the basic timing throughout the data processing system of FIG. 1.

In FIG. 8, a waveform +(CLK+20) is delayed 10 nanoseconds after the +CLOCK signal and has positive-going transitions at t1, t11, t21 and so forth.

The waveform −(CLK+20) is a wave form derived by delaying the +CLOCK signal by 20 nanoseconds and inverting the result. The −(CLK+20) waveform has positive-going transitions at t7, t17, t27 and so on.

In FIG. 8, the +φ(0) signal is one of the outputs from the clock unit 74-1 of FIG. 4. The +φ(0) signal has a logical 1 level only when the control signal, −READY, is a logical 0. The presence of positive-going transitions and logical 1 levels of the +φ(0) signal of FIG. 8 is dependent upon the processing of information by the sequencer. An illustrative example of the operation will be described.

Referring to FIG. 7, it is assumed at t0 time that the predicted status in the flip-flop 133 differs from the actual status in the flip-flop 134. In the particular example of FIG. 8, the predicted status is false so that the Q* output of flip-flop 133 is a logical 1 (and the complementary Q output therefore is 0). It is also assumed that the actual status is true so that the Q* output of flip-flop 134 is a logical 1 (therefore the complementary Q output is a logical 0). Under these conditions where the predicted status in flip-flop 133 differs from the actual status in flip-flop 134, the NAND gate 147 receives two logical 1 inputs so that its output is forced to a logical 0. The logical 0 output from gate 147 overrides the output from gate 148 so that the +BUS READY signal is a logical 0. With that signal a logical 0, the −READY signal is a logical 1 thereby enabling the AND gate 135 in FIG. 7.

In FIG. 8, between t1 and t2 the timing inputs to gate 135, +(CLK+10) and −(CLK+20), are also logical 1's and the output from gate 135 becomes a logical 1 to enable the NAND gates 145 and 146. The NAND gate 146 has all 1's on its input and hence produces a 0 as an output. That 0 connects to the set (S) input of flip-flop 133 causing the flip-flop to be set to form a 1 on the Q output and a 0 on the Q* output. With flip-flops 133 and 134 now indicating the same status, both gates 147 and 148 have logical 1 outputs thereby causing +BUS READY to be a logical 1 and −READY to be a logical 0 disabling AND gate 135. With −READY a logical 0, the clock unit 64 of FIG. 4 produces a positive-going transition at t12 of the +φ(0) clock signal approximately 20 nanoseconds after the next positive-going transition of +CLOCK at t10. The positive-going transition at t12 of the +φ(0) signal causes the stack register 72, the explicit register 88, the next sequential register 89 and other registers throughout the sequencer of FIG. 3 to store microaddresses where one of those microaddresses is selected to be used to address the microstore 45 in FIG. 3. The particular one of the registers which is selected to supply the microaddress is determined by the decoded outputs from the AND gates 151 through 154 of FIG. 7. The microaddress selected by the gates 151 through 154 appears on the microaddress bus 57 of FIG. 3 and remains present on that bus until a new register is selected to provide a new microaddress on bus 57. The microaddress remains on the bus 57 until the next +φ(0) positive-going transition. In the example of FIG. 8, the period is from t12 until t22.

In FIG. 8, at t7, the −(CLK+20) signal has a positive-going transition which clocks the flip-flop 134 to store the actual status represented by the −BUS COMB STATUS signal. It is assumed in the present example that at t7, the status is a logical 0 so that the store 134 does not change state.

At time t17, the +φ(0) signal has a negative-going transition and remains a logical 0 until t22. The +φ(0) signal, in its inverted form −φ(0), is one input to the NAND gate 126 in FIG. 7. When −φ(0) is a logical 0, the output from gate 126 is a logical 1 so that the output from gate 127 is a logical 0 (assuming −SCANOUT SEL remains a 1). At t13, after +φ(0) goes to a logical 0, +CTL MAST goes to a logical 1. During the period from t20 until t30, the microstore 45 causes a microinstruction to appear on the bus mSDO(0-31) as a result of the microaddress appearing from t12 until t22. In FIG. 4, when the +CTL MAST signal goes to a logical 1 at t18, the microinstruction from the bus mSDO(0-31) is made available on the 2Y output of buffer 60 and therefore as an input to the buffer 59. Prior to t13, +CTL MAST is held to a logical 0 by a 0 for the +INTERNAL ENABLE signal to the gate 126 of FIG. 7. After t13, the −φ(0) signal controls +CTL MAST as shown in FIG. 8. At t22, when the +φ(0) signal has a positive-going transition, buffer 59 stores the microinstruction made available from the buffer 60.

In FIG. 8, the microinstruction on the bus mI(0-31) remains until the next positive-going transition at +φ(0) which occurs at t32.

During the period from t1 through t37, the −READY signal remains a logical 0 so that the gate 135 of FIG. 7 remains disabled during this period. With gate 135 disabled, flip-flop 133 is not set or reset at the times t10 through t11, t21 through t22 and t31 through t32.

At each of the times t7, t17 and t27, the actual status is stored in flip-flop 134 by the positive-going transitions of the −(CLK+20) signal. In the present example, it is assumed that the predicted status and the actual status have not changed during this period from t7 through t31. Under these conditions, the positive-going transitions of +φ(0) occur at t12, t22 and t32 without interruption. The positive-going transitions at t12, t22, and t32 cause microaddresses 1, 2 and 3 to be selected onto the bus mADR(0-31). The microaddresses from t12 through t22, from t22 through t32, and from t32 through t42 result in microinstructions 1, 2 and 3 appearing on the bus mSDO(0-31) from t20 through t30, from t30 through t40 and from t4 through t50, respectively.

In FIG. 8, at t32, the second microinstruction from the bus mSDO(0-31) is made available by the +CTL MAST signal and becomes stored in the buffer 59 of FIG. 4.

At t37, the positive-going transition of the −(CLK+20) signal is assumed to change the actual status in the flip-flop 134 of FIG. 4. At that time, the −READY signal is switched to a logical 1 while the predicted status in flip-flop 133 has continued to remain the same. Since −READY continues to be a logical 1 until after the positive-going transition of the +CLOCK signal at t40, the +φ(0) signal does not have another positive-going transition until t52 which is after the next positive-going transition of +CLOCK signal at t50.

Between t41 and t42, the AND gate 135 in FIG. 4 is enabled due to the logical 1 state of the −READY signal. Gate 135 enables the gates 145 and 146 so that flip-flop 133 is again set or reset to indicate the same status as the actual status flip-flop 134. Therefore, after t41, the −READY signal is returned to a logical 0 thus enabling the clock unit 64 of FIG. 4 to begin to generate the +φ(0) signal after the next positive-going transition of the +CLOCK signal at t50.

The effect of the above sequence has been to skip a positive-going transition in the +φ(0) signal which could have occurred at t42. Since the transition did not occur at t42, the third microinstruction address and the resulting microinstruction on the bus mSDO(0-31) occurring between t40 and t50 is not stored in the buffer 60 of FIG. 4. Rather, the second microinstruction stored in buffer 64 at t32 remains until the next positive-going signal of +φ(0) at t52. After t41, when the predicted status flip-flop 133 changed states, that change in states causes the +STP and +SFP outputs to cause another one of the selection lines from AND gates 151 through 154 in FIG. 7 to be selected to select a fourth microaddress on the bus mADR(0-31). That new address appears between t41 and t52 resulting in a fourth microinstruction between t50 and t60. At t52, that fourth microinstruction is clocked into the buffer 59 by the positive-going transition of the +φ(0) signal. The fourth microinstruction remains in the buffer 59 from t52 until t62. The microinstruction on the bus mI(0–31) are indicated to be the first microinstruction between t22 and t32, the second microinstruction between =and t52 and the fourth microinstruction between t52 and t62. It is apparent that the third microinstruction was never latched into the buffer 59 of FIG. 4. The failure to latch the third microinstruction into the buffer 59 is because the actual status of flip-flop 134 did not match the predicted status of flip-flop 133. Due to this mismatch, an extra cycle was required to fetch he proper microinstruction since the prefetched instruction in accordance with the predicted status was not the one desired.

In FIG. 8, after t41, the −READY signal remains a logical 0 so that the positive-going transitions of +φ(0) continue to occur at t52, t62, and t72. The fourth, fifth and sixth microinstructions become latched at t52, t62 and t72.

STACK UNIT CONTROL—FIG. 9

In FIG. 9, the stack unit control 52 of FIG. 3 is shown in further detail. The control 52 functions to control the stack unit 50 of FIG. 3 in three different states, namely, HOLD, PUSH, and POP. Under a POP state, a microaddress is to be accessed from the stack unit 50. Under a PUSH state, a microaddress is to be stored into the stack unit 50 for subsequent retrieval. The control 52 of FIG. 9 includes a stack pointer including counters 168 and 169 for determining the location in stack memory 53 from which a microaddress is to be fetched or into which a microaddress is to be stored. Also, the control 52 includes a link pointer including the counters 170 and 171 for determining what location in the link memory 54 a microaddress is to be read. When the control is in a hold state, the stack pointer represented by the count in counters 168 and 169 and the link pointer represented by the count in counters 170 and 171 is not altered.

When a microaddress is to be fetched from the stack unit 50 of FIG. 3, it is stored in the stack register 72. The contents of the stack register 72 are selected by the stack multiplexer 56 under control of the +STACK CTL(0) and +STACK CTL(1) signals.

In FIG. 9, the control 52 functions to provide the control signals +STACK CTL(0) and +STACK CTL(1) as outputs from the multiplexer 181. Those two control signals are decoded by the stack multiplexer 56 of FIG. 3 to select one of the four sources of microaddresses in the stack unit 50 of FIG. 3.

Additionally, the control 52 functions to provide from multiplexer 180 the 4-bit stack memory address, SADR(0-3), to address the stack memory 53 of FIG. 3. The control 52 functions to produce the 16-bit link memory address, LADR(0-15), to address the link memory 54 of FIG. 3. The link address is output from selected ones of the buffers 183, 184, and 185.

In FIG. 9, stack unit addresses are supplied by the counters 168 and 169. The address in counter 168 differes by one count from the address in counter 168. An address is selected from counter 168 or counter 169 by multiplexer 180.

Under command of a 0 for +UVC3, the link memory address is supplied by the low-order bits LADR(6–13) from buffer store 184 and by bits LADR(14,15) from buffer store 183. The bits LADR(0–5) are not used and are provided as 0's by buffer store 183. The address in counter 171 is one count greater than the address in counter 170. Under command of a 0 for −UVC3, the address LADR(0–15) is supplied by buffer store 185 from bus −EXTmADR(0–15).

The FIG. 9 circuitry receives control signals from the sequencer control of FIG. 7, decoded microinstruction signals from the microinstruction decoder of FIG. 6, and the signal +mI(1) from the microinstruction bus.

In FIG. 9, the NAND gate 160 is satisfied by the +STP (selected status true path), −F4 (jump on true), and +F0 (not HOLD) signals from the flip-flops of FIG. 7. Similarly, the NAND gate 161 is satisfied by the +SFP (select status false path) +F4 (jump on false), and +F0 (not HOLD) signals from the flip-flops of FIG. 7. NAND gates 160 and 161 in turn provide inputs to the NAND gate 162. When NAND gate 162 detects that either gate 160 or gate 161 is satisfied with an output 0, it provides the +STACK SEL signal as a 1. That signal in turn enables the NAND gates 163, 164, 166 and 172.

The NAND gate 163 functions, when enabled by a 1 for +STACK SEL, to detect the microinstruction signal +mI(1). When that microinstruction signal is a logical 1, AND gate 163 is satisfied to produce the +CUR POP signal. The +CUR POP signal signifies that a new microaddress is to be read (popped) from the stack unit 50 of FIG. 3.

In FIG. 9, the AND gate 164, when enabled by a 1 for +STACK SEL, is satisfied whenever the +mI(1) signal is a logical 1 and produces the +CUR PUSH signal. The +CUR PUSH signal signifies that a new microaddress is to be written (pushed) into the stack unit 50 of FIG. 3.

All of the counters 168 through 171 are 4-bit up-/down counters. The parallel inputs to the counters are A, B, C and D, and the parallel outputs are respectively, QA, QB, QC and QD. The counters 168 and 169 each have carryouts C0. The counters are parallel loaded by a logical 0 on the L input, count up or down with a logical 1 or 0, respectively, on the U/D input, and are enabled by logical 0 inputs on both the P and T inputs. All of the counters 168 through 171, when enabled, are clocked, by positive-going transitions of the +φ(0) signal.

In FIG. 9, the counters 168 and 169 are always enabled with a 0(ground) on the T input. Counters 168 and 169 are enabled on the P input as a function of the output of the NAND gate 172.

All of the counters 168 through 171 are parallel loaded under control of the −SEL B0 signal which is one of the signals output from the decoder 112 in the microinstruction decoder of FIG. 6.

The data inputs A through D of counter 168 are connected to logical 1's (+S5) to load 1's into the four locations of the counter. The data inputs A through D of counters 169 and 170 are connected to logical 0's to load 0's into the four locations of each counter. The A, B, C and D inputs of counter 171 are connected to 1, 0, 0 and 0, respectively, to load 1000 into the counter. When thus loaded, counter 168 is loaded binary 1111 and counter 169 is loaded binary 0000. The count 1111 is one count away from the count 0000. The counting sequence when counting down is 0000, 1111, 1110, 1101, . . . , 0001.

The carry-out, −C0, from counter 168 connects as the second input to NAND gate 172 when in turn connects as an input to the NAND gate 174 and to the P inputs of counters 168 and 169.

The −C0 outputs from counters 168 and 169 both connect as inputs to the NAND gate 173 which has its output connected to the B input of multiplexer 181.

In FIG. 9, the PUSH flip-flop 165 receives on its D input the +CUR PUSH signal and stores it when clocked by the +φ(0) signal. The Q output from flip-flop 165 connects to the NAND gate 167 along with the +φ(30) and −φ(60) signals. The NAND gate 167, when satisfied, produces the −STACK MEM SEL signal which enables the stack memory 53 of FIG. 3 to write data. The stack memory 53 in FIG. 3 therefore is enabled to write data whenever a store (push) is to occur as signified by the state of the flip-flop 165.

NAND gate 166 receives the Q* output from the PUSH flip-flop 165 together with the +STACK SEL signal from gate 162 and the +ml(1) signals from the microinstruction bus. The output from gate 166 connects to the control input S of multiplexer 180.

The function of multiplexer 180 is to select the 4-bit SADR(0-3) signal from either the counter 168 (B input) or from the counter 169 (A input) under control of the signal from gate 166. Whenever the signal from gate 166 is a logical 1, the output from counter 168 is selected by multiplexer 180. Whenever the output from gate 166 is a logical 0, multiplexer 180 selects the output from counter 169. Counter 169 stores the address of a location to be used to push a new microaddress into stack memory 53. Counter 168 is employed to pop a microaddress from the last location in stack memory 53 at which a microaddress was stored.

In FIG. 9, the multiplexer 181 operates to form the +STACK CTL 0 signal as a logical 1 or 0 on the 1Y output and to form the +STACK CTL 1 signal as a logical 1 or 0 on the 2Y output. The 1Y output of multiplexer 181 is selected to be connected to one of the inputs 10, 11, 12, or 13 as a function of the state of the control inputs A and B. Similarly, the 2Y output is selected to be connected to one of the inputs 20, 21, 22, or 23 as a function of the A and B inputs of multiplexer 181. The A input of multiplexer 176 connects from the NAND gate 176. Gate 176 produces a logical 1 output whenever the link pointer, represented by the count in counter 170, is greater than 3 (binary 010). NAND gate 176 produces a logical 0 output whenever the link pointer is equal to or less than a count of 3.

In FIG. 9, the B input to multiplexer 181 connects from the NAND gate 173. Gate 173 produces a logical 1 output whenever a carry-out signal, −CO, from either counter 168 or counter 169 is a logical 0. Such carry-outs indicate that the stack memory pointer is at a 0 count and hence that the stack memory is empty and stores no microaddresses. Whenever an absence of both carry-outs exists (−CO logical 1), the output from gate 173 is a logical 0. Counters 168 and 169 produce a logical 0 carry-out if at a count of binary 1111 and counting up or at a count of binary 0000 and counting down.

In order for the outputs 1Y and 2Y of multiplexer 181 to be selected at a logical 1 value, the signal bus +CUR PUSH must be a logical 0 indicating an absence of a push into the stack memory. If there is a push into the stack memory, the +CUR PUSH signal is a logical 1 which disables the multiplexer 181 forcing its 1Y and 2Y outputs to logical 0. The operation of the multiplexer 181 is presented in the following CHART I.

CHART I

| INPUTS | | | OUTPUTS | | FUNCTION |
|---|---|---|---|---|---|
| +CUR PUSH | B | A | +STACK CTL(0) | +STACK CTL(1) | STACK MUX |
| 0 | 0 | 0 | 0 | 1 | STACK MEM |
| 0 | 0 | 1 | 0 | 1 | STACK MEM |
| 0 | 1 | 0 | 1 | 0 | LINK MEM |
| 0 | 1 | 1 | 1 | 1 | IMPLICIT REG |
| 1 | — | — | 0 | 0 | DI REG 2 |

In CHART I, when the +CUR PUSH signal is a logical 1, the +STACK CTL 0 and +STACK CTL 1 signals are both logical 0's. When those two signals are logical 0's, multiplexer 56 in FIG. 3 functions to select the data in register, DI REG 2, in FIG. 3. Whenever the +CUR PUSH signal is a logical 0, the multiplexer 181 in FIG. 8 is enabled to select outputs as a function of the A and B inputs. Whenever the B input from NAND gate 173 is a logical 0, the +STACK CTL 0 signal is a logical 0 and the +STACK CTL 1 line is a logical 1. Under these conditions, the multiplexer 56 of FIG. 3 selects the stack memory 53.

A logical 1 output from the NAND gate 173 indicates the existence of a carry-out from either one of the counters 168 or 169 thereby indicating that the stack memory 53 is empty of microaddresses. If counters 168 and 169 do not produce a carry-out, the output from NAND gate 173 is a logical 0 indicating that the stack memory 53 is not empty and is to be selected (when enabled by +CUR PUSH equal to 1) since it stores microaddresses. When the output from NAND gate 173 is a logical 1, then the NAND gate 176 operates to cause selection of the link memory 54 or the implicit address register 55-1.

The operation of the FIG. 9 circuits is described in connection with the following CHART II-A for a HOLD state followed by five POP states.

CHART II-A

| CYCLE | +STACK SEL | CTR 170 DCBA | CTR 171 DCBA | +CUR POP | GATE 172 | GATE 174 | GATE 175 | GATE 176 | BIT 14/15 |
|---|---|---|---|---|---|---|---|---|---|
| 1 | 0 | 0000 | 0001 | 0 | 1 | 1 | 1 | 0 | 00 |
| 2 | 1 | 0000 | 0001 | 1 | 1 | 0 | 1 | 0 | 01 |
| 3 | 1 | 0001 | 0010 | 1 | 1 | 0 | 1 | 0 | 10 |
| 4 | 1 | 0010 | 0011 | 1 | 1 | 0 | 1 | 0 | 11 |
| 5 | 1 | 0011 | 0100 | 1 | 1 | 0 | 0 | 1 | 00 |
| 6 | 1 | 0100 | 0101 | 1 | 1 | 0 | 1 | 1 | 01 |

In CHART II-A, six cycles of the sequencer are described. In CYCLE 1, the −SEL B0 signal loads all of the counters 168 through 171. Counter 168 is loaded with 1111 and counter 169 is loaded with 0000. The counters 170 and 171 are loaded as shown in CHART II-A. For purposes of the present example, it is assumed that no PUSH occurs so that counters 168 and 169 do not have their counts changed.

In CYCLE 1, the +F0 signal is assumed to be equal to a logical 0 indicating that the apparatus is in a HOLD state. That 0 causes both gates 160 and 161 to produce 1's so that gate 162 produces a 0 for +STACK SEL. Therefore, the +CUR POP signal is a logical 0 and the output from gate 172 is a logical 1. The 1 output from gate 172 during a HOLD state disables counters 168 and 169 from being incremented or decremented by any input clock signal. Since the T input of counters 168 and 169 is always enabled with a logical 0, the carry-outs from counters 168 and 169 will always appear as a function of the counts in counters 168 and 169 and the state of the up/down (U/D) inputs. Since the U/D inputs are connected to the +CUR POP line which is a logical 0 (count down) in CYCLE 1, counter 168 provides a logical 1 from its carry-out. That logical 1 disables the counters 170 and 171.

The logical 0 for +CUR POP forces the output from gate 174 to a logical 1 causing the contents of counter 170 to be selected by the multiplexer 182 for storage in the buffer 183.

In CYCLE 1, the 0 for +CUR POP forces a 1 output for gate 175. The 0 from the QC output of counter 170 is inverted to provide a second 1 input to gate 176 so that gate 176 provides a logical 0 output.

In CYCLE 2, it is assumed that +F0 changes to 1 and that gate 162 provides a 1 output for +STACK SEL. Further, it is assumed that +mI(1) is a logical 1 so that a POP from the stack unit 50 of FIG. 3 is to occur so that +CUR POP is a 1. The counts in counters 168 and 169 have not changed. However, the +CUR POP signal now signifies that the counters 168 and 169 are in the counting up mode. Therefore in CYCLE 2, the counter 168 has a logical 0 carry-out which enables counters 170 and 171 but which forces the gate 172 to have a logical 1 output disabling counters 168 and 169 from counting. The 1's from gate 172 and 163 force a 0 output from gate 174. The inputs to gate 176 are unchanged and it retains a 0 output. The next two clock cycles increment the counters 170 and 171 and counters 168 and 169 are not changed.

In CYCLES 3 and 4, it is assumed that a POP is still called for and therefore +STACK SEL and +CUR POP remain a 1. The output from gate 172 remains a logical 1 still disabling counters 168 and 169.

In CYCLE 5, counter 171 has been incremented so that the QC output is a logical 1. That logical 1 together with a logical 1 for the +CUR POP signal causes the output of gate 175 to switch to a logical 0. That logical 0 forces the output of gate 176 to a logical 1. The 1 from gate 176 causes the multiplexer 181 to provide control signals which select the implicit register 55-1 from microaddresses.

The CYCLE 6, counters 170 and 171 are again incremented and the QC output of counter 170 becomes a logical 1 thereby disabling the counters 170 and 171 from further counting. The 1 output from counter 170 is inverted as a 0 input to 176 so that the output from gate 176 remains a logical 1 until counters 170 and 171 become reset in connection with a new target instruction.

In FIG. 9, the multiplexer 182 functions to select the two low-order bits, LADR(14,15), from either the counter 170 or the counter 171. The selection of the inputs from counters 170 and 171 is under control of the S input from NAND gate 174. A logical 0 output from gate 174 selects the two low-order bits from counter 171 and a logical 1 selects counter 170.

As indicated in CHART II-A, the bits LADR(14, 15) are accessed from the counter 170 in CYCLE 1 and are equal to 00. The CYCLE 1 was a HOLD state during which a new target instruction was introduced into the sequencer of FIG. 3. The target instruction Op Code appears on the bus RB(0-7) and is latched into the buffer 184 by the −SEL B0 signal which is the same signal which parallel loads the counters 168 through 171. The Op Code from buffer 184 appears as the high-order bits LADR(6-13) and the low-order bits LADR(14,15) are derived from the buffer 183. During the HOLD state, those two low-order bits are 00.

In CYCLE 2 of CHART II, the multiplexer 182 selects the low-order bits LADR(14,15) from the counter 171 and those bits are 01.

In CYCLE 3, the bits LADR(14,15) are selected from the counter 171 and are 10.

In CYCLE 4, the bits are selected from counter 171 and are 11.

In CYCLE 5 and thereafter, the microaddresses are no longer taken from the link memory 54 so that the link memory address LADR(0-15) is no longer relevant until counters 170 and 171 are reloaded and a new Op Code is stored in buffer 184 in connection with a new target instruction.

In FIG. 9, the six high-order bits LADR(0-5) are selected by buffer 183 equal to 0(ground), and the two low-order bits, LADR(14-15) are selected from the multiplexer 182. The 8 bits LADR(6-13) are selected from buffer 184 where they are latched by the −SEL B0 signal from the result bus RB(0-7). A +UVC(3) signal gates the buffers 183 and 184 to produce the link address, LADR(0-15).

A −UVC(3) signal gates the buffer 185 as the LADR(0-15) output. Buffer 185 is loaded with the external microaddress bus, −EXTmADR(0-15).

An example of the operation of the FIG. 9 circuit for HOLD, POP, PUSH, and POP states is given in the following CHART II-B.

CHART II-B

| mI CYCLE | CTR 168 DCBA | CTR 169 DCBA | CTR 170 DCBA | CTR 171 DCBA | +STACK SEL | +CUR PUSH | +CUR POP | GATE 166 | GATE 172 | GATE 173 | GATE 174 | GATE 175 | GATE 176 | BIT 14/15 |
|---|---|---|---|---|---|---|---|---|---|---|---|---|---|---|
| 1 | 1111 | 0000 | 0000 | 0001 | 0 | 0 | 0 | 1 | 1 | 1 | 1 | 1 | 0 | 00 |
| 2 | 1111 | 0000 | 0000 | 0001 | 1 | 0 | 1 | 0 | 1 | 1 | 0 | 1 | 0 | 01 |
| 3 | 1111 | 0000 | 0001 | 0010 | 1 | 1 | 0 | 1 | 0 | 1 | 1 | 1 | 0 | 01 |
| 4 | 1110 | 1111 | 0011 | 0010 | 1 | 0 | 1 | 0 | 0 | 1 | 1 | 1 | 0 | 01 |
| 5 | 1111 | 0000 | 0001 | 0110 | 1 | 0 | 1 | 0 | 1 | 1 | 0 | 1 | 0 | 10 |
| 6 | 1111 | 0000 | 0010 | 0011 | 1 | 0 | 1 | 0 | 1 | 1 | 0 | 1 | 0 | 11 |
| 7 | 1111 | 0000 | 0011 | 0100 | 1 | 0 | 1 | 0 | 1 | 1 | 0 | 0 | 1 | 00 |
| 8 | 1111 | 0000 | 0100 | 0101 | 1 | 0 | 1 | 0 | 1 | 1 | 0 | 0 | 1 | 00 |

MICROINSTRUCTION FIELD DEFINITION

Microinstructions accessed from the microstore 45 of FIGS. 2 and 3 are each 32 bits in length (not including any error-correcting or detecting codes). The 32-bit microinstructions each include a number of established fields as identified in the following CHART III.

CHART III

| | | | MODE | | |
|---|---|---|---|---|---|
| mI | NORMAL | LOOP | E CONDITIONAL | XMIT | BROADCAST |
| mI0 | SC0 | SC0 | SC0 | SC0 | SC0 |
| mI1 | SC1 | SC1 | SC1 | SC1 | SC1 |
| mI2 | mA0 | mA0 | mA0 | mA0 | mA0 |
| mI3 | mA1 | mA1 | mA1 | mA1 | mA1 |
| mI4 | JOF | JOF | JOF | JOF | JOF |
| mI5 | 0 | 0 | 1 | 1 | 1 |
| mI6 | 0 | 1 | 0 | 1 | 1 |
| mI7 | 0 | 1 | 1 | 0 | 1 |
| mI8 | PS | PS | PS | PS | PS |
| mI9 | MS0 | MS0 | MS0 | XMS0 | BMS0 |
| MI10 | MS1 | MS1 | MS1 | XMS1 | BMS1 |
| mI11 | MS2 | MS2 | MS2 | XMS2 | BMS2 |
| mI12 | US0 | US0 | US0 | RMS0 | US0 |
| mI13 | US1 | US1 | US1 | RMS1 | US1 |
| mI14 | US2 | US2 | US2 | RMS2 | US2 |
| mI15 | SS0 | SS0 | CM0 | SS0 | SS0 |
| mI16 | SS1 | SS1 | CM1 | SS1 | SS1 |
| mI17 | SS2 | SS2 | CM2 | SS2 | SS2 |
| mI18 | SS3 | SS3 | CM3 | SS3 | SS3 |
| mI19 | DS0 | DS0 | EA0 | DS0 | BT0 |
| mI20 | DS1 | DS1 | EA1 | DS1 | BT1 |
| mI21 | DS2 | DS2 | EA2 | DS2 | BT2 |
| mI22 | DS3 | DS3 | EA3 | DS3 | BT3 |
| mI23 | F0 | F0 | EA4 | F0 | F0 |
| mI24 | F1 | F1 | EA5 | F1 | F1 |
| mI25 | F2 | F2 | EA6 | F2 | F2 |
| mI26 | F3 | F3 | EA7 | F3 | F3 |
| mI27 | F4 | F4 | EA8 | F4 | F4 |
| mI28 | F5 | F5 | EA9 | F5 | F5 |
| mI29 | F6 | F6 | EA10 | F6 | F6 |
| mI30 | F7 | F7 | EA11 | F7 | F7 |
| mI31 | F8 | F8 | EA12 | F8 | F8 |

SC - STACK CONTROL
MS - MODULE SELECT
RMS - RECEIVING MODULE SELECT
mA - mADDRESS SELECT
XMS - TRANSMITTING MODULE
SS - SOURCE REGISTER SELECT
JOF - JUMP ON FALSE
BMS - BROADCASTING MODULE SELECT
CM - CONDITION MASK
PS - PREDICTED STATUS
US - UNIT SELECT
DS - DESTINATION REGISTER SELECT
BT - BROADCAST TYPE
EA - EXPLICIT mADDRESS
F - FUNCTION SELECT

In CHART III, the left-hand column identifies the thirty-two bits mI0 through mI31. Some of the field definitions for the microinstruction change as a function of the MODE of operation. In CHART III, five modes are indicated consisting of NORMAL, LOOP, CONDITIONAL, XMIT and BROADCAST. The MODE is established by the field consisting of the microinstruction bits mI5, mI6, and mI7.

In CHART III, bits mI0 and mI1 are a stack control field which control the operation of the stack unit 50 in FIGS. 2 and 3. The stack unit 50 operation is a HOLD, a PUSH or a POP as indicated in the following CHART IV.

CHART IV

| mI0 | MI1 | STACK UNIT 50 OPERATION |
|---|---|---|
| 0 | 0 | HOLD |
| 0 | 1 | HOLD |
| 1 | 0 | PUSH |

-continued

CHART IV

| mI0 | MI1 | STACK UNIT 50 OPERATION |
|---|---|---|
| 1 | 1 | POP |

Under a HOLD, the stack pointer and the link pointer, represented by counts in the counters of FIG. 9, remain unchanged.

During a HOLD operation, the OP CODE of a new target instruction becomes stored in the buffer store 184 of FIG. 9.

Under a PUSH operation, the stack pointer, represented by counters 168 and 169 in FIG. 9, are incremented to store a microaddress in the next sequential location of the stack memory 53 of FIG. 3.

During a POP operation, a new microaddress is accessed from the stack memory 53, the link memory 54 or some other stack storage unit 55 in a manner described in connection with FIG. 9. Briefly, if the stack pointer (represented by the counters 168 and 169 in FIG. 9) is not equal to 0, then this indication means that there are one or more microaddresses in the stack memory 53 of FIG. 3. When the stack pointer is not equal to 0, then the microaddress is accessed from the stack memory 53. If the stack pointer is equal to 0 (indicating the stack memory 53 is empty of microaddresses) then the link memory pointer (the count in counters 170 and 171 of FIG. 9) is incremented (unless exhausted) and a microaddress is accessed from the link memory 54. If the link memory has been exhausted (the link pointer equal to or greater than 4) then the microaddress is accessed from some other stack source unit 55 such as the implicit address register 55-1 of FIG. 3.

The stack pointer and the link pointer become invalid upon completion of any BROADCAST mode microinstruction of type 0 and thereafter become valid again upon completion of the next microinstruction execution.

In CHART III, the bits mI(2,3) represent a microaddress select field which, together with the path selection bit mI(4) and the status stored in predicted status store 133 of FIG. 7 control selection of the next microaddress.

In CHART V, the selection operation specified as a function of the microaddress select field mI(2,3) is shown.

CHART V

| mI(2) | mI(3) | OPERATION |
|---|---|---|
| 0 | 0 | Select Next Sequential Reg. (89) |
| 0 | 1 | Select Indirect Reg. (90) |
| 1 | 0 | Select Explicit Reg. (88) |
| 1 | 1 | Select STACK Reg. (72) |

The mI(2) and mI(3) values are stored in the flip-flops 130 and 131 respectively, of FIG. 7. The output from the flip-flops 130 and 131 are connected as inputs to the NAND gates 136 through 144 to participate in the logical selection operation indicated in CHART V as a function of the values of mI(2,3).

In NORMAL, XMIT and BROADCAST modes, the microaddress selected in accordance with CHART V is used. In CONDITIONAL and LOOP modes the selected microaddress in accordance with CHART V is used only if the jump is taken, otherwise the next sequential address (from register 89 in FIG. 3) is used.

In CHART III, the mI(4) bit is a logical 1 for jump on false (JOF) and a logical 0 for jump on true. The mI(4) is stored in the flip-flop 132 in FIG. 7. The outputs from the flip-flop 132 are input to the NAND gates 136 through 144 and participate in the selection of the microaddress in the following manner.

If the jump on false bit mI(4) is a logical 1, and the current status which becomes stored in flip-flop 133 selects a true path (+STP=1) then the jump is not taken and the next sequential register 89 of FIG. 3 is selected (gate 137 FIG. 7).

If mI(4) is 1 and the current status stored in flip-flop 133 selects the false path (+SFP=1) then the jump is taken and the operation specified in CHART V results as a function of mI(2,3).

If mI(4) is a 0, and the false path is selected (+SFP=1) then the jump is not taken and the next sequential register 89 is selected (gate 138 of FIG. 7).

If mI(4) is 0 and the current status selects the true path (+STP=1) then the operation specified in CHART V is carried out as a function of mI(2,3).

In CHART III, the bit mI(8) is a predicted status bit which is stored by the CB(8) signal in the predicted status flip-flop 133 of FIG. 7. The predicted status bit mI(8) allows a program to specify the most probable current processor unit status and thus the most probable path to be selected. The program sets the predicted status flip-flop 133 of FIG. 7 and thereafter prefetches a microinstruction as a function of the state of the mI(8) bit. The processing unit is pipelined into the microinstruction level so that the fetching of the next microinstruction is overlapped with the execution of the current microinstruction. When the execution is conditional, as can occur in the LOOP and CONDITIONAL modes, it is not always certain which microinstruction path will actually be required, that is, whether a jump will be taken or not taken. Under these circumstances where a conditional situation exists, the microinstruction fetched is the one which is established by program as being the most probable path. Then very late in the execution cycle of the current microinstruction, the condition becomes determined and the current processing status (stored in flip-flop 134 of FIG. 7) does not match the predicted status (stored in flip-flop 133) then a machine cycle must be expended while the correct microinstruction is fetched. The prefetching and fetching of microinstructions in accordance with predicted and actual status is described in connection with the FIG. 8.

In CHART III, the bits mI(9-31) represent different information as a function of the mode established by the field mI(5-7).

In the NORMAL mode (000), the field mI(9-11) specifies the logic module 40-0 through 40-6 of FIG. 2 which is to perform the operation specified by the current microinstruction.

The field mI(12-14) specifies the functional unit on the selected logic module enabled to perform the current microinstruction operation.

The field mI(15-18) specifies the source data register on the selected logic module enabled for the current microinstruction operation.

The field mI(19-22) specifies the result data register on the selected logic module enabled to be loaded with the results of the operation performed by the current microinstruction.

The field mI(23-31) specifies the operation specified for the selected functional unit on the selected logic module for the current microinstruction.

All microinstructions will alter the contents of the selected RESULT DATA REGISTER so that care must be taken to avoid unintentional register alteration. By convention, the RESULT DATA REGISTER 15 is not implemented and can thus be specified to avoid unintentional alteration.

All microinstructions will select one functional unit for the current microinstruction operation so that care must be taken to avoid unintentional operations.

In the LOOP mode (011) the field definitions are the same for bits mI(9-31). In the NORMAL mode, however, the process unit status is always TRUE. In the LOOP mode, however, the processing unit status is either TRUE or FALSE. The status is TRUE whenever the loop count is greater than 0 on the current microinstruction initiation. The status is FALSE when the loop count is equal to 0 on the current microinstruction initiation. When the loop count is greater than 0, the loop count is decremented upon completion of the current microinstruction. When the loop count equals 0, the loop count is unaltered.

In the CONDITIONAL mode (101), bits mI(9-31) have the following meanings.

The field mI(9-11) specifies the logical module of the processor modules 40-0 through 40-6 of FIG. 2, which is selected to provide the processing unit status.

The field mI(12-14) specifies the functional unit on the selected logic module enabled to provide unit status. No operation is performed by the functional unit, however.

The field mI(15-18) specifies the 4-bit condition mask used for testing the status of the selected functional unit.

The field mI(19-31) provides the explicit microaddress which when called for is entered into the explicit address register 88 of FIG. 3. The 13-bit explicit address provided by mI(19-31) provides the low-order bits of the microinstruction address. The three high-order bits are determined by the three high-order bits of the current microinstruction address.

In the CONDITIONAL mode, the status is given by the following logical equation:

$$\text{STATUS} = \sum_{N=0} [\overline{CM}(N) \cdot US(N)] \qquad \text{Eq. (1)}$$

where:

$\overline{CM}(N)$ = inverted 4-bit mask mI(15-18) where N=0, 1, 2, 3

US(N) = selected 4-bit field from selected functional unit where N=0, 1, 2, 3

In Eq. (1), an example is given when the condition mask, mI(15-18) is 0001 and the unit status (US) is 1111. Under these conditions, the STATUS in Eq. (1) is given as a logical 1. Eq (1) is implied by inverting 0001 for the condition mask (CM) to 1110. Thereafter, that inverted quantity is logically AND'ed with the unit status (US) on a bit-by-bit basis. The logical AND on a bit-by-bit basis is 1111. Thereafter, each of the four bits is logically OR'ed in a four-way OR producing in the example given a logical 1.

In another example, the condition mask is 0010 which is inverted to 1101. If the unit status is 0010 then the logical AND is a 0000. The logical OR of the 0000 bits in a four-way OR is a logical 0.

In the XMIT mode (110), the status is always TRUE and the bits mI(9–31) are as follows. The field mI(9–11) is the logical module 40-0 through 40-6 of FIG. 2 which is selected as the transmitting module.

The field mI(12–14) is the logical module 40-0 through 40-6 which is selected as the receiving module.

The field mI(15–18) is the selected SOURCE DATA REGISTER on the selected transmitting module.

The field mI(19–22) is the selected RESULT DATA REGISTER on the selected receiving module which is enabled to be loaded with the transmitted data. The field mI(23–31) is satisfied to be used for special control functions.

In the BROADCAST mode (111), the status is always TRUE and the field mI(9–31) has the following definition. The field mI(9–11) is the logical module 40-0 through 40-6 selected as the broadcasting module.

The field mI(12–14) is satisfied to be used for special control purposes.

The field mI(15–18) is the selected SOURCE DATA REGISTER on the selected broadcasting module.

The field mI(19–22) is the selected broadcast type as shown in the following CHART VI.

The field mI(23–31) is available to be used for special control purposes.

The broadcast types which are defined by the field mI(19–22) in the BROADCAST mode are given in the following CHART VI.

includes a processor module interface 46-2 connected to a result bus, RB(0–31), and a source bus, SB(0–31. The interface 46-2 connects to the 10-bit control lines, CL(0–9), to the 32-bit data bus, DB(0–31), and to the 32-bit control bus, CB(0–31). The processor module interface 46-2 is similar to the interface shown in FIG. 4. The module 40-2 is selected for operation by a decode of the field mI(9–11) stored within interface 46-2.

Up to eight functional units, FU0, FU1, . . . , FU7 connect directly or indirectly between the source bus and the result bus. The functional units in FIG. 10 are selected for operation by a decode of the microinstruction field mI(12–14) which is stored and decoded within the processor module interface 46-2.

The ALU module of FIG. 10 includes a plurality of registers connected either to the result bus, RB(0–31), or to the source bus, SB(0–31). The registers in FIG. 10 are identified in terms of their output ports connected to the source bus in which case they are the S-BUS registers, SR0, SR1, . . . , SR15. Similarly, the registers are identified in terms of their input port connected to the result bus in which case they are the R-BUS registers, RR0, RR1, . . . , RR14. The gating out from the registers to the source bus is controlled by a decode in interface 46-2 of the microinstruction field mI(15–18). The gating in of information from the result bus to the result bus registers is controlled by a decode in interface 46-2 of the microinstruction field mI(19–22).

The names and connections of the functional units, the R-BUS registers and the S-BUS registers and their selection and the function of the microinstruction fields is given in the following TABLE I.

TABLE I

| | | Module 40-2 | | | |
|---|---|---|---|---|---|
| Functional Units | mI(12–14) | R-BUS Registers | mI(19–22) | S-BUS Registers | mI(15–18) |
| FU0 Logic Unit | 000 | RR0 Temp 0 | 0000 | SR0 Temp 0 | 0000 |
| FU1 Binary Arithmetic Unit | 001 | RR1 Temp 1 | 0001 | SR1 Temp 1 | 0001 |
| FU2 BCD Arithmetic Unit | 010 | RR2 Temp 2 | 0010 | SR2 Temp 2 | 0010 |
| FU3 Condition Code Unit | 001 | RR3 Temp 3 | 0011 | SR3 Temp 3 | 0011 |
| FU4 Loop Counter Unit | TOP | RR4 Temp 4 | 0100 | SR4 Temp 4 | 0100 |
| FU5 Sign Extension Unit | 101 | RR5 Temp 5 | 0101 | SR5 Temp 5 | 0101 |
| FU6 Conversion Unit (HiWord) | 110 | RR6 Alutemp A | 0110 | SR6 Alutemp A | 0110 |
| FU7 Conversion Unit (LoWord) | 111 | RR7 Alutemp B | 0111 | SR7 Logical Address | 0111 |
| | | RR8 Alutemp C | 1000 | SR8 Zero's | 1000 |
| | | RR9 Alutemp D | 1001 | SR9 TI(8–15) | 1001 |
| | | RR10 Alutemp E | 1010 | SR10 TI(8–11) | 1010 |
| | | RR11 Alutemp F | 1011 | SR11 TI(12–15) | |
| | | RR12 Encoded Condition | 1100 | SR12 Condition Code(CC) | 1100 |
| | | RR13 Conv. Digit Weight | 1101 | SR13 First Reg. Contents | 1101 |
| | | RR14 Program Mask | 1110 | SR14 mI(24–31 | 1110 |
| | | RR15 | | SR15 Status | 1111 |

CHART VI

| mI(19–22) | BROADCAST FUNCTION |
|---|---|
| 0000 | TI(0–31) |
| 0001 | TI(32–47) |
| 0010 | Target Machine Control Register, CR(0) |
| 0011 | Target Machine Control Register, CR(1) |
| 0100 | Target Machine Control Register, CR(14) |
| 0101 | Target Machine Control Register, CR(9) |
| 0110 | Target Machine PSW 0–31 |
| 0111 | Target Machine PSW 32–63 |
| 1000 | Target Machine First Register Contents |
| 1001 | Update First Register Contents and Set Condition Code, CC |
| 1010 | Target Machine Logical Address |
| 1011 | Indirect Microaddress Register |
| 12–15 | NOT USED |

ALU PROCESSOR MODULE—FIG. 10

In FIG. 10, further details of the arithmetic and logic unit (ALU) module 40-2 are shown. The module 40-2

In addition to the connection of functional units and registers between the source bus and the result bus, the ALU temporary registers TEMP A, TEMP B, . . . , TEMP F, connect in parallel to the binary ALU 189 which is both the functional unit FU0 (logical) and functional unit (arithmetic) FU1 and to the BCD arithmetic unit FU2. Additionally, a barrel shifter 188 is provided for connecting the output from the binary ALU 189 to the result bus. Similarly, the BCD airthmetic unit 186 has a skewer 187 connecting its output port to the result bus.

FIRST EXAMPLE OF TARGET EXECUTION

In the present example, an IBM System/370 target instruction having an RR format is described. In the RR format, the target instruction includes the bits TI(0–15). The bits TI(0–7) define the Op Code and the bits TI(-

8-11) define an R1 field which is an encoded representation identifying a 32-bit register (in module 42-2 of FIG. 2) containing the Operand 1. The TI(12-15) bits define an R2 field which is an encoded representation identifying the register (in module 42-2 of FIG. 2) containing the Operand 2.

A particular example of an instruction in RR format is the Add instruction which has Op Code 1A(HEX). The 1A Add instruction adds Operand 2 to Operand 1 and places the sum in the Operand 1 location. If the carry-out of the sign-bit position and the carry-out of the high-order numeric position agree, the sum is satisfactory; if they disagree, an overflow occurs. The sign bit is not changed after the overflow. A positive overflow yields a negative final sum, and a negative overflow results in a positive sum.

The resulting condition code (CC) for a 1A Add is a 0 if the sum is 0, a 1 if the sum is less than 0, a 2 if the sum is greater than 0 and a 3 if an overflow occurs.

The sequencer 40-4 of FIGS. 2 and 3 functions to intitiate microinstruction sequencing for causing the execution of the 370 1A Add target instruction in accordance with the following CHART IV.

CHART IV). The bits mI(2,3) are 00 indicating that the sequencer control of FIG. 7 selects (in accordance with CHART V) for the next microaddress, the next sequential microaddress, 007A (see mI-2 in CHART VII). In the current microinstruction mI-2, a HOLD state is again specified by the field mI(0,1) and the next microaddress is selected as the next sequential address, 007B, by the field mI(2,3). The effect of the mI-1 and mI-2 microinstructions in CHART VII is to wait for two microinstruction cycles before arriving at the mI-3 microinstructions. The wait caused by the mI-1 and mI-2 microinstructions is useful for diagnostics but otherwise can be eliminated.

In CHART VII, mI-3 has 111 in the field mI(5-7) indicating that a BROADCAST mode is to be entered (see CHART III). The field mI(0,1) still indicates a HOLD state. The field mI(2,3) indicates that the next microinstruction is to come from the next sequential microaddress, 007C (see mI-4). In the current microinstruction mI-3, the field mI(9-11) is 000 indicating that the processor module 40-0 is the module which is to be the source of the information (target instruction) to be broadcast to all the other modules 40-1 through 40-6.

CHART VII

| mI-No. | NAME | mADR (HEX) | 01 | 23 | 4 | 5-7 | 8 | 9-11 | 12-14 | 15-18 | 19-22 | 23-31 |
|---|---|---|---|---|---|---|---|---|---|---|---|---|
| 1 | MAIN | 0079 | 00 | 00 | 0 | 000 | 1 | 111 | 111 | 1111 | 1111 | 000000000 |
| 2 |  | 007A | 00 | 00 | 0 | 000 | 1 | 111 | 111 | 1111 | 1111 | 000000000 |
| 3 |  | 007B | 00 | 00 | 0 | 111 | 1 | 000 | 111 | 0001 | 0000 | 000000000 |
| 4 |  | 007C | 00 | 00 | 0 | 111 | 1 | 000 | 111 | 0010 | 0001 | 000000000 |
| 5 |  | 007D | 00 | 00 | 0 | 000 | 1 | 100 | 010 | 0001 | 1111 | 000011111 |
| 6 | MAINWAIT | 007F | 00 | 10 | 0 | 011 | 1 | 111 | 111 | 1111 | 0000 | 001111110 |
| 8 | LNKRROPR | 0306 | 11 | 11 | 0 | 000 | 1 | 010 | 101 | 0100 | 0110 | 000000000 |
| 9 | LNKAR | 0311 | 11 | 11 | 0 | 000 | 1 | 010 | 101 | 0011 | 0000 | 000100100 |
| 10 | LNKCCT03 | 030C | 11 | 11 | 0 | 111 | 1 | 010 | 111 | 0000 | 1001 | 110010011 |
| 11 | MAIN | 0079 | 00 | 00 | 0 | 000 | 1 | 111 | 111 | 1111 | 1111 | 000000000 |
| 12 |  | 007A | 00 | 00 | 0 | 000 | 1 | 111 | 111 | 1111 | 1111 | 000000000 |
| 13 |  | 007B | 00 | 00 | 0 | 111 | 1 | 000 | 111 | 0001 | 0000 | 000000000 |
| 14 |  | 007C | 00 | 00 | 0 | 111 | 1 | 000 | 111 | 0010 | 0001 | 000000000 |
| 15 |  | 007D | 00 | 00 | 0 | 000 | 1 | 100 | 010 | 0001 | 1111 | 000011111 |
| 16 | MAINWAIT | 007F | 00 | 10 | 0 | 011 | 1 | 111 | 111 | 1111 | 0000 | 001111110 |
| 17 |  | 007F | 11 | 11 | 0 | 000 | 1 | 111 | 111 | 1111 | 1111 | 000000000 |

A target instruction (such as Add) to be executed is accessed from the storage unit 35 of FIG. 1 transferred over the system bus 37, and stored in the processor unit 34. In order to execute the target instruction, a subroutine MAIN is entered to broadcast the target instruction to all the processor modules 40-0 through 40-6 of FIG. 2. The MAIN subroutine is stored in microstore 45 at the location addressed by microaddress 0079(HEX). When the microstore 45 is addressed with address 0079(HEX), the 32-bit microinstruction mI-1 of CHART VII is accessed.

In FIG. 3, the 32-bit microinstruction accessed from the microstore 45 appears on the data out bus, mSDO(-0-31), and is gated onto the control bus 42, CB(0-31), and latched in the buffer 59 of FIG. 4. In a similar manner, each of the other modules 40-0 through 40-6 of FIG. 4 includes an interface of the FIG. 4 type for simultaneously latching each accessed microinstruction. In the sequencer module 40-4 of FIG. 2 and the interface of FIG. 4, each microinstruction is presented to the microinstruction decoder 66 for further decoding.

In CHART VII, the MAIN subroutine is initiated with the microinstruction mI-1 which has all 1's for the bits mI(8-22). Those 1's represent the null state so that no operation is performed. The bits mI(0,1) are 00 indicating that the processing unit is in the HOLD state (see In mI-3, the field mI(12-14) is a null condition. The field mI(15-18) identifies the source register in module 40-0 as register 0001 which is the register storing the target instruction TI(0-31). The 0000 in the field mI(1-9-22) identifies the broadcast type as TYPE 0. The broadcast TYPE 0 causes the target instruction, TI(-0-31), to be stored in each of the processor modules 40-1 through 40-6.

The field mI(5-7) is input to the decoder 101 of FIG. 6 and, in the case of mI-3, the -BROADCAST line is decoded as a logical 0. That logical 0 is stored in flip-flop 108 and enables the broadcast type decoder 112 to energize the line —SEL B0 as a logical 0. That logical 0 then loads the stack pointer and link pointer counters of FIG. 9 and the buffer store 184 of FIG. 9. Buffer store 184 is loaded with the contents of the RB(0-7) bus which includes the contents of the result buffer 61 of FIG. 4. The result buffer 51 of FIG. 4 has the TI(0-15) bits loaded in the field RB(0-15). The field RB(0-7) is the Op Code 1A(HEX) of the Add target instruction which is to be executed by the system of FIG. 1.

In accordance with the present invention, the microaddresses of the first four microsubroutines to be executed in connection with the target instruction are stored in the link memory 54 of FIGS. 2 and 3. For the Add instruction, Op Code 01A, the four microsubroutines stored in link memory 54 are LNKRROPR, LNKAR, LNKCCT03 and MAIN. The first microinstruction for each of these microsubroutines are stored in the microstore 45 at the microaddresses 0306, 0311, 030C, and 0079, respectively (all given in hexadecimal notation).

In the particular example chosen, the entries in the link memory 54 are accessed in order and appear in CHART VII as microinstructions mI-8, mI-9, mI-10 and mI-11. Before execution of those microinstructions, the microinstructions mI-4 through mI-7 must be executed to complete execution of the MAIN subroutine of microinstructions.

The mI-4 microinstruction is for broadcasting the remainder of the target instruction bits TI(32–47) for those target instructions which require such a field. In the present example, the field TI(32–47) is not defined so that the function of mI-4 can be ignored.

The mI-5 microinstruction is in NORMAL mode, the module 40-2 [mI(9–11)=010] is selected and the loop counter 224, [mI(12–14)=100] is loaded with 1F(HEX).

The mI-6 microinstruction is in a LOOP mode in which the loop counter 224 of FIG. 10 is stepped until it has counted through the quantity loaded in mI-5 [that is 1F(HEX)]. The mI-5 and mI-6 microinstructions are employed in connection with diagnostic operations and hence can be ignored or eliminated for purposes of the present invention.

The current mI-7 microinstruction is in the NORMAL mode and the 11 in mI(0,1) field specifies the POP state and the next microaddress is selected from the TOS stack register 72 under control of the 11 in the field mI(2,3). The TOS stack register 72 contains the first microaddress from the link memory as addressed by the Op Code of the target instruction loaded in mI-3 into the buffer store 184 of FIG. 9 and not altered since. Also, the counters 168 through 171 of FIG. 9 have not changed count, multiplexer 181 has continued to select the link memory 54, and multiplexer 182 has continued to select bits 14 and 15 as 00. The operation and loading of the TOS stack register has been described in connection with FIG. 9, CHARTS I and II. Since the link memory 54 has been preloaded with the address of the first four microinstructions of the microsubroutines necessary to execute the target instruction, the mI-8 through mI-11 microinstructions can now be accessed from the link memory. The next microaddress for the first one of the microinstructions is accessed from the TOS stack register 72 by mI-7.

The mI-8 microinstruction is the LNKRROPR microsubroutine which is a link register to register operation. The LNKRROPR microinstruction is in a NORMAL mode which calls for a POP state and selection of the next microaddress from the TOS stack register 72.

In mI-8, the field mI(9–11) [equal to 101] specifies the module 40-2 of FIG. 10. The field mI(12–14) [equal to 101] specifies the arithmatic and logic unit (ALU) 189 as the functional unit selected. The field mI(15–18) [equal to 0100] specifies that the Temp 4 register 192 holds Operand 2, the register identified by the R2 field of the target instruction. The Operand 2 is transferred from Temp 4 register 192 through the ALU 189 to ALU Temp A register 199 identified by the field mI(19–22) [equal to 0110].

At this point in the execution, the Operand 2 specified by the R2 field of the target instruction is available in ALU Temp A register 199 at the T input port of the ALU 189. At the same time, Operand 1 specified by the R1 field of the target instruction is available in the Temp 3 register 191, at the S input port of the AIU 189.

When the microinstruction mI-8 is completed, the return is to the next microaddress in the link memory which is the microaddress in CHART VII for mI-9. The mI-9 microinstruction is in the NORMAL mode and calls for a POP state with the next microinstruction address selected from the TOS stack register 72. The module specified by the field mI(9–11) is the module 40-2 of FIG. 10. The functional unit selected by the field mI(12–14) is the ALU 189. The source register identified by field mI(15–18) [equal to 0011] is the Temp 3 register 191 which contains Operand 1. The operand 2 specified by the R2 field is available in the ALU Temp A register 199 on the T input to the ALU in register 192. The function specified by the field mI(23–31) is to add the operands presented on the S and T inputs to the ALU 189. The sum produced as a result of the add is placed in the destination Temp 0 register 190 specified by the 0000 in the field mI(19–22).

The return from the mI-9 microinstruction is to the next entry in the link memory which is mI-10 in CHART VII. The mI-10 microinstruction is in BROADCAST mode in the POP state and the next microinstruction is selected from the TOS stack register 72. In mI-10, the source module 40-2 is identified by the field mI(9–11). The source register 190 (Temp 0) is identified by the 0000 in field mI(15–18) and that is the same register that the sum was placed in in mI-9. The broadcast function specified by the field mI(19–22) is 1001 which, according to CHART VI, updates the R1 register 191 (Temp 3) with the sum in the Temp 0 register 190 and sets the condition code as a function of the sum formed.

In mI-10, the field mI(23,24) causes the sum in the register 190 specified by 0000 in mI(15–18) to be placed in the first register 191. The bit mI(27) causes the condition code to be set. The field mI(30,31) causes the condition code to be set in accordance with the TYPE 03 condition. The TYPE 03 condition, the condition code (CC), is a 0 if the sum is 0, a 1 if the sum is less than 0, a 2 if the sum is greater than 0, and a 3 if an overflow occurs.

After completion of the mI-10 microinstruction, the return is to be MAIN subroutine at microaddress 0079 supplied by the link memory 54. The MAIN subroutine is the same one as the one which was used to broadcast the target instruction 1A Add. The MAIN subroutine is then available to broadcast a new target instruction. In this manner, target instructions are sequentially executed. The next target instruction can be, for example, the one now described in connection with a second example of target instruction execution.

SECOND TARGET INSTRUCTION EXECUTION EXAMPLE

The second example is a 370 target instruction with RX format. In the RX format, the target instruction includes the field TI(0–31). In that field, the Op Code is in the field TI(0–7). The field TI(8–11) designates a quantity R1 which represents an encoded value for a register holding Operand 1. The field TI(12–15) includes a quantity X2, the field TI(16–19) includes a quantity B2 and the field TI(20–31) includes a quantity D2. The B2 field is a 4-bit field for identifying a general register containing a 24-bit base address. The X2 field is a 4-bit index field designating a general register generating a 24-bit number. The D2 field is a 12-bit number called the displacement. The 24-bit addresses from the registers specified by the X2 and B2 fields are added together and added to the displacement in the B2 field to form the address of the Operand 2 in the storage unit 35 of FIG. 1.

A particular example of a 370 target instruction is the LOAD instruction having Op Code 58(HEX). The function of the LOAD instruction is to take the Operand 2 at the address calculated from the X2, B2 and D2 and place it in the location of the register specified by the R1 field. In this instruction, the condition code remains unchanged.

The sequence of microinstructions and microaddresses required to execute the LOAD target instruction having the Op Code 58(HEX) is shown in the following CHART VIII.

In the present example, it is assumed that the status is bad and the jump to the explicit address is not taken, but rather the next sequential microaddress is accessed in microinstruction mI-10. The mI-10 microinstruction is in the CONDITIONAL mode, the HOLD state and the next microaddress is selected from the stack unit 72 if the jump is not taken. The mI-10 instruction attempts to obtain a storage unit address from a translation look-aside buffer (TLB) to access the storage unit 35. If the access to the TLB is successful, the the microinstruction mI-10 jumps to the explicit address in the field mI(1-9-31).

Assuming in the present example, however, that no translation look-aside buffer is available to provide the address, then the next sequential microaddress is selected to access mI-11. The mI-11 microinstruction is in the NORMAL mode, the HOLD state and the next

CHART VIII

| mI-No. | NAME | mADR (HEX) | 01 | 23 | 4 | 5-7 | 8 | 9-11 | 12-14 | 15-18 | 19-22 | 23-31 |
|---|---|---|---|---|---|---|---|---|---|---|---|---|
| 1 | MAIN | 0079 | 00 | 00 | 0 | 000 | 1 | 111 | 111 | 1111 | 1111 | 000000000 |
| 2 |  | 007A | 00 | 00 | 0 | 000 | 1 | 111 | 111 | 1111 | 1111 | 00000000 |
| 3 |  | 007B | 00 | 00 | 0 | 111 | 1 | 000 | 111 | 0001 | 0000 | 000000000 |
| 4 |  | 007C | 00 | 00 | 0 | 111 | 1 | 000 | 111 | 0010 | 0001 | 000000000 |
| 5 |  | 007D | 00 | 00 | 0 | 000 | 1 | 100 | 010 | 0001 | 1111 | 000011111 |
| 6 | MAINWAIT | 007F | 00 | 10 | 0 | 011 | 1 | 111 | 111 | 1111 | 0000 | 001111110 |
| 7 |  | 007F | 11 | 11 | 0 | 000 | 1 | 111 | 111 | 1111 | 1111 | 000000000 |
| 8 | LNKRXFC | 031D | 00 | 00 | 0 | 000 | 1 | 001 | 010 | 1111 | 1111 | 001000000 |
| 9 |  | 031E | 00 | 10 | 1 | 101 | 0 | 001 | 011 | 1111 | 0001 | 100101110 |
| 10 |  | 031F | 00 | 10 | 1 | 101 | 1 | 001 | 011 | 0100 | 0001 | 100100100 |
| 11 |  | 0320 | 00 | 00 | 0 | 000 | 1 | 001 | 001 | 1111 | 1111 | 000000100 |
| 12 |  | 0321 | 10 | 10 | 0 | 000 | 1 | 111 | 111 | 1111 | 0001 | 110100000 |
| 13 | DAT | 03A0 |  |  |  |  |  |  |  |  |  |  |
| 14 |  | 03A1 |  |  |  |  |  |  |  |  |  |  |
| 15+ |  |  |  |  |  |  |  |  |  |  |  |  |
| 16+ |  | 0322 | 00 | 00 | 0 | 000 | 1 | 001 | 010 | 1111 | 1111 | 001000000 |
| 17+ |  | 0323 | 00 | 10 | 1 | 101 | 0 | 001 | 011 | 1111 | 0001 | 100101110 |
| 18+ | RXFCH002 | 032E | 11 | 11 | 0 | 110 | 1 | 001 | 010 | 0001 | 1001 | 000000000 |
| 19+ | LNKLRX | 0346 | 11 | 11 | 0 | 111 | 1 | 010 | 111 | 1001 | 1001 | 110000000 |
| 20+ | MAIN | 0079 | 00 | 00 | 0 | 000 | 1 | 111 | 111 | 1111 | 1111 | 000000000 |

In CHART VIII, the microinstructions mI-1 through mI-7 are the same as in CHART VII. The link memory 54 of FIG. 2 contains the four microaddresses 031D, 0346, 0079, and 0000 at the microaddress locations addressed by the target instruction Op Code (58) combined with the two low-order bits 14/15. These addresses in the link memory correspond to the microinstruction subroutines LNKRXFCH, LNKLRX, and MAIN. The 0000 for the fourth address is unused.

The return from mI-7 is to the microinstruction 031D.

The return from mI-7 is to the microinstruction 031D which is mI-8 in CHART VIII. The mI-8 microinstruction is in the NORMAL mode, the HOLD state in which the next microaddress is selected as the next sequential microaddress (mI-9). Module 40-1 is selected by the mI(9–11) field. The mI(12–14) field selects a status unit on the module 40-1. The 1 in the mI(25) bit functions to cause a fetch command to the system bus 37.

The next sequential microaddress accesses the mI-9 microinstruction which is in the CONDITIONal mode, in a HOLD state and the next microaddress is from the TOS stack unit 72 if the jump is not taken. The mI-9 microinstruction functions to determine if the storage unit 35 can be accessed and if the status is not bad, the instruction will go to the explicit address contained in mI(9–31) taking the jump.

microaddress is accessed from the next sequential address. The function performed by mI-11 microinstruction is to generate the sum X+B+D to form the logical address in the storage unit of the desired operand. At this point, the logical address of the desired operand must be translated to obtain a real address. The translation is made using a dynamic address translation (DAT) microsubroutine.

The next sequential microaddress accesses mI-12. The mI-12 microinstruction is in the NORMAL mode in the PUSH state and the next microinstruction is selected from the explicit register 88. Register 88 is loaded by the 13 low-order bits mI(19–31) of mI-12 and the 3 high-order bits of the microaddress for mI-12. During the next cycle, mI-13, the PUSH called for by the field mI(0,1) of microinstruction mI-12 causes the next sequential address (0322) from the registers 55-2 and 55-3 of FIG. 3 to be stored in the stack memory 53 in a manner previously described in connection with FIG. 9. In this manner, the microaddress 0322(HEX) is stored in the stack memory 53 as the entry point to return to after the DAT microsubroutine is executed. The DAT microsubroutine translates the logical address calculated in mI-11 to a real address using conventional microprogramming steps occuring from mI-13 to mI-15+ where the "+" designates some unspecified number of conventional microinstructions.

After calculating the real address using the DAT microsubroutine, the machine returns to the microinstruction mI-16+ which is in the NORMAL mode, HOLD state and functions to command a fetch to the system bus 37.

The mI-16+ microinstruction causes the next sequential microaddress to be employed and mI-17+ is accessed. The mI-17+ microinstruction is a CONDITIONAL mode in the HOLD state in which the explicit address is selected if the jump is taken and otherwise the next sequential address is selected. At this time, it is assumed that access to the storage unit 35 can be made so that a jump is taken to the explicit microaddress [032E(HEX)] in the field mI(19-31) of mI-17+.

The microaddress 032E accesses microinstruction mI-18+ which is in the XMIT mode in the POP state, and the next microaddress is selected from the TOS stack register 72. The operand accessed from the storage unit is transmitted from the module 40-1 to the module 40-2 and a return is made to the microaddress provided by the TOS stack register 72.

At this point, the TOS stack register 72 is loaded with the microaddress (0346(HEX] provided by the link memory 54 for mI-19+.

The mI-19+ microinstruction is in the BROADCAST mode in the POP state and the next microaddress is selected from the TOS stack register 72. The function of mI-19+ is to set the R1 register in the modules of FIG. 2 equal to the operand just fetched from the storage unit.

The next microaddress [0079(HEX)] provided by the TOS stack register 72 accesses the MAIN subroutine in mI-20+.

At this point, the execution of the target instruction LOAD having OP Code 58(HEX) has been completed and the MAIN subroutine can provide access to a new target instruction.

While two examples of target instruction execution have been given where the two target instructions are in accordance with the IBM 370 architecture, it will be apparent that any instruction, whether of the 370 type or otherwise may be executed using the apparatus of the present invention.

While the invention has been particularly shown and described with reference to the preferred embodiments thereof, it will be understood by those skilled in the art that those changes in form and details may be made therein without departing from the spirit and the scope of the invention.

What is claimed is:

1. A digital computer comprising,
a microstore for storing subroutines of microinstructions, said microinstructions accessable, when addressed by microaddress, for controlling said digital computer,
microaddress generation means for generating microaddresses for addressing said microstore to access microinstructions, said microaddress generation means including a link memory having locations for storing predetermined microaddresses for linking subroutines of microinstructions, including a stack memory having locations for storing microaddresses in connection with the execution of microinstructions, and including generation control means for controlling the accessing of microaddresses from said said link memory and said stack memory to address said microstore wherein said generation control means includes stack pointer means storing a stack pointer for pointing to locations in said stack memory and to an empty location; includes pointer means for storing a link pointer pointing to locations in said link memory, said link pointer means including link counter means for storing said link pointer as a number and controlled to be counted each time a microaddress is accessed from said link memory, includes means for controlling the locations pointed to by said stack pointer means and said link pointer means, and includes selection means for selecting microaddresses from locations pointed to by said link pointer only when said stack pointer points to said empty location.

2. The computer of claim 1 wherein said stack pointer means includes stack counter means for storing said stack pointer as a number and controlled to count away from a number representing said empty location for each microaddress loaded into said stack memory and controlled to count toward the number representing said empty location for each microaddress accessed from said stack memory.

3. The computer of claim 2 wherein said stack counter means includes first and second stack counters connected to be stepped in parallel, said stack pointer means including means for presetting said stack counters to different numbers, said stack pointer means including multiplexer means for selecting the stack pointer as a number from one or the other of said first or second stack counters as a function of whether microaddresses are being stored into said stack memory or are being fetched from said stack memory.

4. The computer of claim 1 wherein said link counter means includes first and second link counters connected to be stepped in parallel, said link pointer means including means for presetting said link counters to different numbers, said link pointer means including multiplexer means for selecting the link pointer as a number from one or the other of said first or second link counters to sequentially access microaddresses from said link memory.

5. The computer of claim 4 including link pointer enabling means for enabling said first and second link counters to be stepped only when said stack pointer is pointing to the empty location.

6. The computer of claim 3 including means for establishing first and second types of operation to pop microaddresses from and push microaddresses into said microaddress generation means, respectively, including enabling means for enabling said stack counters to be counted away from the number representing said empty location in response to a second type of operation and for enabling said stack counters to be counted toward said empty location whenever a first type of operation fetches a microaddress from said stack memory,
said stack pointer means including means for disabling said stack counters in the absence of a first or second type of operation .

7. The computer of claim 1 wherein said microaddress generation means includes one or more additional microaddress source units for providing microaddresses and wherein said generation control means includes means for controlling the accessing of microaddresses from said one or more additional microaddress source units.

8. The computer of claim 7 wherein one of said additional microaddress source units is a next sequential unit including a next sequential register and including adder means for adding one to the current microaddress to form a next sequential microaddress for storage in said next sequential register.

9. The computer of claim 7 wherein one of said additional microaddress source units is an implicit register and means for storing microaddresses into said implicit register directly from a field contained in microinstructions accessed from said microstore.

10. The computer of claim 7 wherein one of said additional microaddress source units is an external unit including an external register, including an external microaddress counter where said external register is loadable with the contents of said external microaddress counter, and including means for controlling said external microaddress counter to be preloaded and stepped under control of said computer.

11. The computer of claim 7 wherein one of said additional microaddress source units is an indirect register loadable under control of microinstructions accessed from said microstore.

12. The computer of claim 1 wherein said microaddress generation means includes a top-of-stack register and includes stack multiplexer control means for selecting microaddresses from said stack memory and said link memory for loading said top of stack register.

13. A digital computer comprising,
means for providing target instructions each having a unique op code
a microstore for storing subroutines of microinstructions, said microinstructions accessable, when addressed by microaddresses, for controlling said digital computer in the execution of target instructions,
microaddress generation means for generating microaddresses for addressing said microstore to access microinstructions, said microaddress generation means including a link memory having a different plurality of locations associated with each one of a number of target instructions where said locations store predetermined microaddresses for linking subroutines of microinstructions unique to each target instruction, including link pointer means for storing a link number pointing to a selected one of said plurality of locations where said link pointer means includes means for changing the link number each time a microaddress is accessed from said link memory, including means for using the op code from each target instruction with said link number to address each of said plurality of locations for each of said target instructions to obtain subroutines of microinstructions for executing each target instruction, and including generation control means for controlling the accessing of microaddresses from said link memory to address said microstore.

14. The digital computer of claim 13 wherein said microaddress generation means includes a stack memory having locations for storing microaddresses in connection with the execution of microinstructions and wherein said generation control means includes means for controlling the accessing of microaddresses from said stack memory.

15. The computer of claim 14 wherein said generation control means includes stack pointer means storing a stack pointer for pointing to locations in said stack memory and to an empty location; includes means for controlling the location pointed to by said stack pointer means and includes selection means for selecting microaddresses from locations pointed to by said link pointer only when said stack pointer points said empty location.

16. The computer of claim 15 wherein said stack pointer means includes stack counter means for storing said stack pointer as a number and controlled to count away from a number representing said empty location for each microaddress loaded into said stack memory and controlled to count toward the number representing said empty location for each microaddress accessed from said stack memory.

17. The computer of claim 16 wherein said stack counter means includes first and second stack counters connected to be stepped in parallel, said stack pointer means including means for presetting said stack counters to different numbers, said stack pointer means including multiplexer means for selecting the stack pointer as a number from one or the other of said first or second stack counters as a function of whether microaddresses are being stored into said stack memory or are being fetched from said stack memory.

18. The computer of claim 13 wherein said link pointer means includes means for incrementing said link number each time a microaddress is accessed from said link memory.

19. The computer of claim 18 wherein said link counter means includes first and second link counters connected to be stepped in parallel, said link pointer means including means for presetting said link counters to different numbers, said link pointer means including multiplexer means for selecting the link pointer as a number from one or the other of said first or second link counters to form link memory addresses in combination with said op code to sequentially access microaddresses from said link memory.

20. The computer of claim 19 including link pointer enabling means for enabling said first and second link counters to be stepped only when said stack pointer is pointing to the empty location.

21. The computer of claim 17 including means for establishing first and second types of operation to pop microaddresses from and push microaddresses into said microaddress generation means, respectively, including enabling means for enabling said stack counters to be counted away from the number representing said empty location in response to a second type of operation and for enabling said stack counters to be counted toward said empty location whenever a first type of operation fetches a microaddress from said stack memory,
said stack pointer means including means for disabling said stack counters in the absence of a first or second type of operation.

22. The computer of claim 13 wherein said microaddress generation means includes one or more additional microaddress source units for providing microaddresses and wherein said generation control means includes means for controlling the accessing of microaddresses from said one or more additional microaddress source units.

23. The computer of claim 22 wherein one of said additional microaddress source units is an implicit register and means for storing microaddresses into said implicit register directly from a field contained in microinstructions accessed from said microstore.

24. The computer of claim 13 wherein said microaddress generation means includes a top-of-stack register and includes stack multiplexer control means for selecting microaddresses from said stack memory and said link memory for loading said top of stack register.

25. A digital computer for executing target instructions comprising,
- a microstore for storing microinstructions, said microinstructions accessable from said microstore, when addressed by microaddresses, for controlling said digital computer,
- means responsive to microinstructions accessed from said microstore for performing data manipulations under control of said microinstructions,
- microaddress generation means for sequentially generating microaddresses for addressing said microstore to access sequentially microinstructions from said microstore, said microaddress generation means comprising,
  - a stack unit including a link memory for storing groups of predetermined microaddresses each of said groups of predetermined microaddresses specifying a corresponding predetermined group of microinstructions to be linked and sequentially executed for each target instruction, each of said predetermined microaddresses in a group located in sequential locations, including a stack memory for storing and fetching microaddresses during the execution of said predetermined group of microinstructions, including a top-of-stack register for storing a microaddress from said stack memory or said link memory, and including stack control means for controlling the selection of microaddresses for said top-of-stack register independent of the execution of microinstructions,
  - an additional microaddress source unit,
  - generation control means for controlling the accessing of microaddresses from said stack unit and from said additional microaddress source unit.

26. The computer of claim 25 including means for providing target instructions each having an op code and wherein said stack unit includes address means for addressing said link memory with op codes from each target instruction, one or more of said op codes specifying a plurality of said predetermined microaddresses in a group whereby subroutines of microinstructions for executing each target instruction are accessed uniquely for each target instruction.

27. The computer of claim 26 wherein said generation control means includes stack pointer means storing a stack pointer for pointing to locations in said stack memory and to an empty location; includes link pointer means for storing a link pointer pointing in combination with said op code to a predetermined number of locations in said link memory for each target instruction where said predetermined number of locations store said predetermined microaddresses in a group, includes means for controlling the locations pointed to by said stack pointer means and said link pointer means, and includes selection means for selecting microaddresses from locations pointed to by said link pointer only when said stack pointer points to said empty location.

28. The computer of claim 27 wherein said stack pointer means includes stack counter means for storing said stack pointer as a number and means for controlling said stack counter means to count away from a number representing said empty location for each microaddress loaded into said stack memory and to count toward the number representing said empty location for each microaddress accessed from said stack memory.

29. The computer of claim 28 wherein said stack counter means includes first and second stack counters connected to be stepped in parallel, said stack pointer means including means for presetting said stack counters to different numbers said stack pointer means including multiplexer means for selecting the stack pointer as a number from one or the other of said first or second stack counters as a function of whether microaddresses are being stored into said stack memory or are being fetched from said stack memory.

30. The computer of claim 27 wherein said link pointer means includes link counter means for storing said link pointer as a number from a number range equal to said predetermined number and wherein said link counter means is controlled to be counted each time a microaddress is accessed from said link memory.

31. The computer of claim 30 further including a stack source unit forming an additional source of microaddresses and including means for accessing microaddresses from said stack source unit after said predetermined number of microaddresses have been accessed from said link memory.

32. The computer of claim 31 wherein said stack source unit includes implicit address means connected to provide microaddresses directly from a field within a microinstruction.

33. The computer of claim 30 wherein said predetermined number is four.

34. The computer of claim 30 wherein said link counter means includes first and second link counters connected to be stepped in parallel over said number range, said link pointer mens including means for presetting said link counters to different numbers differing by one count for each new one of said target instructions, said link pointer means including multiplexer means for selecting the link pointer as a number from one or the other of said first or second link counters to form link memory addresses in combination with said op code to sequentially access a number, up to said predetermined number, of microaddresses from said link memory.

35. The computer of claim 34 including link pointer enabling means for enabling said first and second link counters to be stepped only when said stack pointer is pointing to the empty location.

36. The computer of claim 35 including means for establishing first and second types of operation to pop microaddresses from and push microaddresses into said microaddress generation means, respectively, including enabling means for enabling said stack counters to be counted away from the number representing said empty location in response to a second type of operation and for enabling said stack counters to be counted toward said empty location whenever a first type of operation fetches a microaddress from said stack memory,
- said stack pointer means including means for disabling said stack counters in the absence of a first or second type of operation.

37. The computer of claim 25 wherein said microaddress generation means includes one or more additional microaddress source units for providing microaddresses and wherein said generation control means includes means for controlling the accessing of microaddresses from said one or more additional microaddress source units.

38. The computer of claim 37 wherein one of said additional microaddress source units is an implicit register and means for storing microaddress into said implicit register directly from a field contained in microinstructions accessed from said microstore.

39. The computer of claim 25 wherein said microaddress generation means includes a top-of-stack register and includes stack multiplexer control means for selecting microaddresses from said stack memory and said link memory for loading said top of stack register.

40. The computer of claim 25 including timing means for controlling said microaddresses generation means to provide microaddresses periodically each period of a computer clock signal.

41. The computer of claim 40 wherein said timing means includes means for overlapping the accessing of microaddresses and the accessing of microinstructions whereby the selection of the microaddress for the next microinstruction is concurrent with the access of the current microinstruction.

42. In a digital computer having a microstore for storing subroutines of microinstructions where the microinstructions are accessable when addressed by microaddress, to control the digital computer, the steps comprising, generating microaddresses to address said microstore by addressing a link memory and a stack memory, said link memory having locations for storing predetermined microaddresses for linking subroutines of microinstructions and said stack memory having locations for storing microaddresses in connection with the execution of microinstructions, using a link pointer pointing to locations in said link memory, controlling the addressing of said stack memory and controlling the addressing of said link memory with said link pointer to sequentially provide microaddresses from said link memory or said stack memory, counting said link pointer each time a microaddress is accessed from said link memory, addressing said microstore with the microaddress selected from said stack memory or said link memory.

43. In the method of claim 42, the steps of, using a stack pointer for pointing to locations in said stack memory and to an empty location, controlling said stack pointer to control the accessing of microaddresses from said stack memory, selecting microaddresses from locations pointed to by said link pointer only when said stack pointer points to said empty location.

44. The method of claim 43 including counting said stack pointer away from a number representing said empty location for each microaddress loaded into said stack memory and counting said stack pointer toward the number representing said empty location for each microaddress accessed from said stack memory.

* * * * *